United States Patent [19]

Sicka et al.

[11] Patent Number: 4,987,808
[45] Date of Patent: Jan. 29, 1991

[54] TUBULAR SLEEVE HANDLING AND CUT-OFF SYSTEM

[75] Inventors: Richard W. Sicka, Brecksville; Dale A. Tompkins, Akron, both of Ohio; Peter Kündig, Männedorf, Switzerland

[73] Assignee: Bridgestone/Firestone, Inc., Akron, Ohio

[21] Appl. No.: 208,715

[22] Filed: Jun. 20, 1988

[51] Int. Cl.[5] .......................... B26D 1/60; B26D 3/16; B26D 30/00
[52] U.S. Cl. ............................................ 83/13; 83/18; 83/54; 83/98; 83/152; 83/153; 83/175; 83/318; 83/471.1; 83/490; 83/647.5; 83/701; 83/825; 269/156; 269/287
[58] Field of Search ...................... 83/54, 13, 308, 309, 83/318, 319, 320, 323, 330, 353, 490, 18, 98, 152, 153, 175, 471.1, 647.5, 825, 701, 37; 156/256, 269, 510, 580.1, 580.2; 269/54, 156, 287

[56] References Cited

U.S. PATENT DOCUMENTS

| | | | |
|---|---|---|---|
| 2,209,995 | 8/1940 | Morris | 83/490 X |
| 2,329,613 | 9/1943 | Hokanson et al. | 269/287 |
| 3,044,336 | 7/1962 | Bock | 83/319 |
| 3,249,998 | 5/1966 | Shultz | 30/101 |
| 3,267,783 | 8/1966 | Kepes | 83/112 |
| 3,456,856 | 7/1969 | Berberian | 225/103 |
| 3,559,520 | 2/1971 | Postins | 83/292 |
| 3,801,398 | 4/1974 | Piersma et al. | 156/120 |
| 3,808,928 | 5/1974 | Plegat | 83/289 |
| 3,982,980 | 9/1976 | van Manen | 156/73.5 |
| 4,175,455 | 11/1979 | Genis | 83/110 |
| 4,283,241 | 8/1981 | Hollmann | 156/117 |
| 4,294,444 | 10/1981 | Horton | 269/156 |
| 4,339,868 | 7/1982 | Mazzer | 29/564.1 |
| 4,484,966 | 11/1984 | Kawamoto | 156/126 |
| 4,492,136 | 1/1985 | Walker | 83/169 |
| 4,567,797 | 2/1986 | Folk | 83/56 |
| 4,657,718 | 4/1987 | Sicka | 264/146 |

Primary Examiner—Hien H. Phan
Attorney, Agent, or Firm—Ernst H. Ruf

[57] ABSTRACT

A system for handling a flexible thin wall tubular extrudate of an elastomeric material of the type used as a body ply element for the manufacture of tires, and for cutting-off a predetermined length sleeve of the extrudate and delivering the sleeve to a discharge station. A pair of grippers is movably mounted on carriage assemblies which move the grippers horizontally and transversely with respect to the axis of the extrudate. The leading gripper provides tension to the extrudate and pulls it along a production axis. The trailing gripper engages the extrudate and moves in unison with the extrudate and the leading gripper along the production axis. The grippers completely circumferentially envelop the length of sleeve to be cut from the extrudate and retain the shape of the extrudate by applying a vacuum thereto. A cutting mechanism having a fixed motor driven blade and a pair of similar pivotally mounted blades moves vertically down into contact with the extrudate between the pair of grippers. The rotating blades are rotated through at least 120° arc to achieve a 360° cut on the extrudate as it is being moved under tension longitudinally by the grippers. After completion of the actual cutting operation the leading gripper transfer the severed sleeve to a discharge station and returns to a home position and now becomes the trailing gripper. The previous trailing gripper becomes the leading gripper and continues to advance the extrudate along the production axis and apply tension thereto for the next cutting operation.

49 Claims, 9 Drawing Sheets

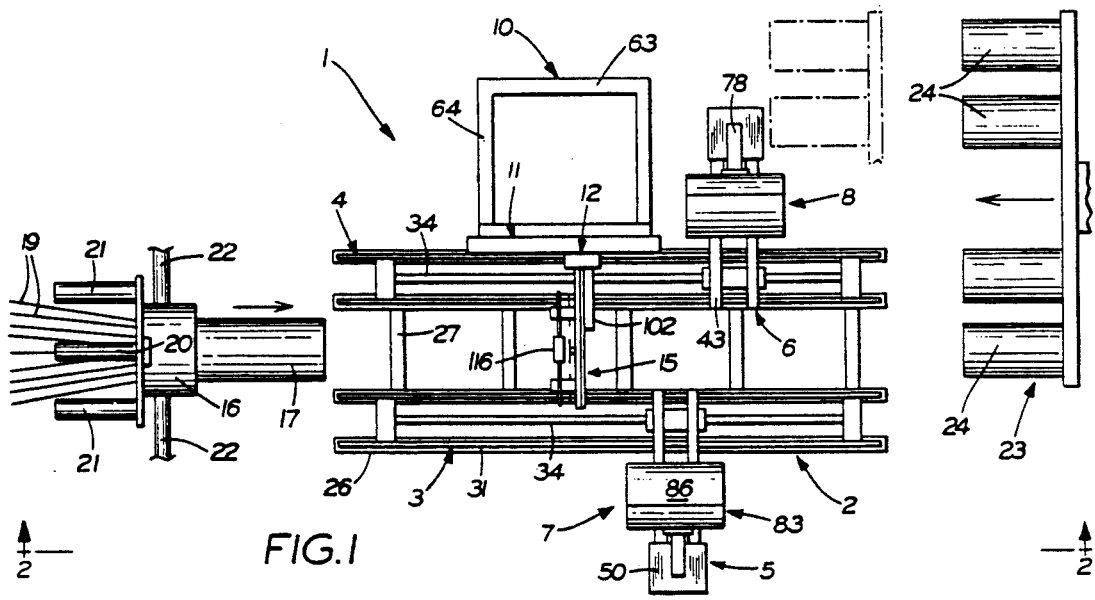
FIG.1
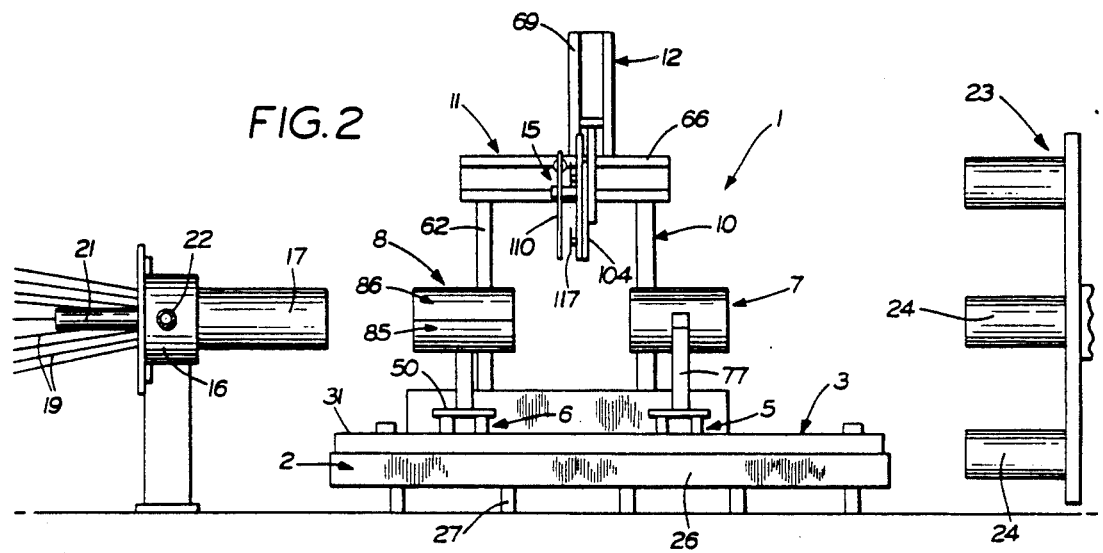
FIG.2
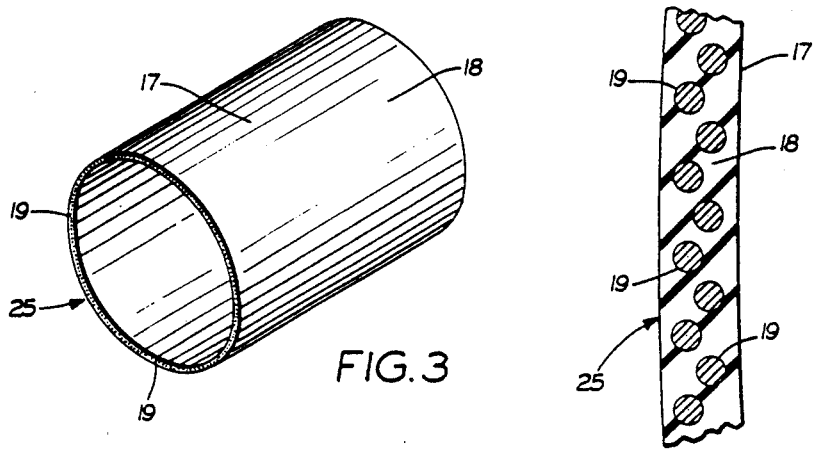
FIG.3
FIG.4

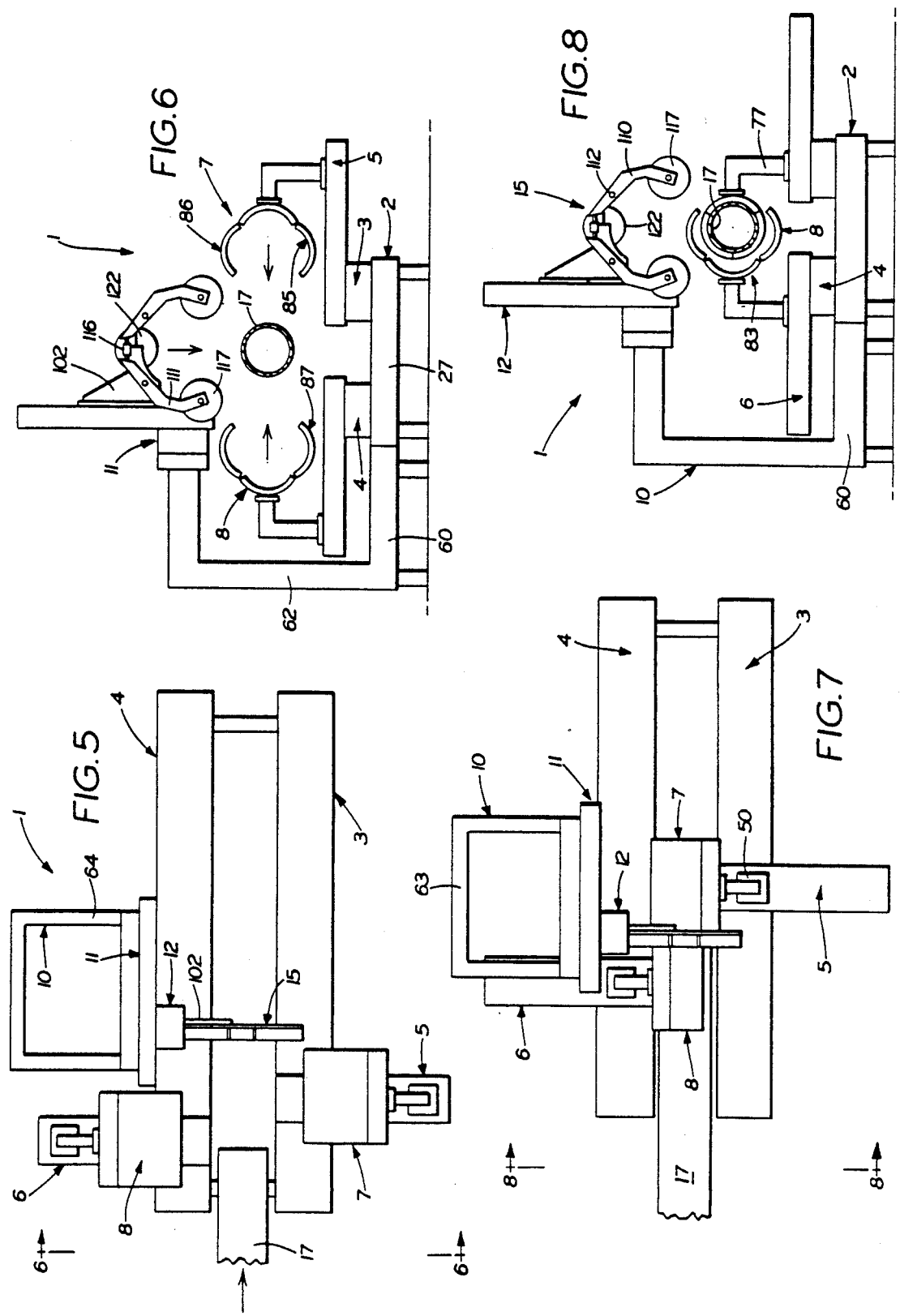

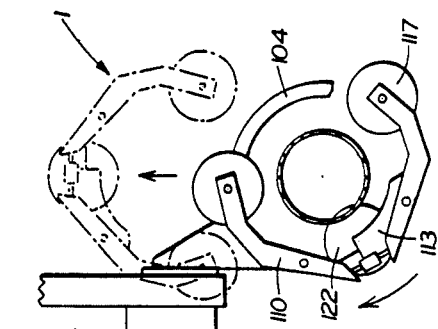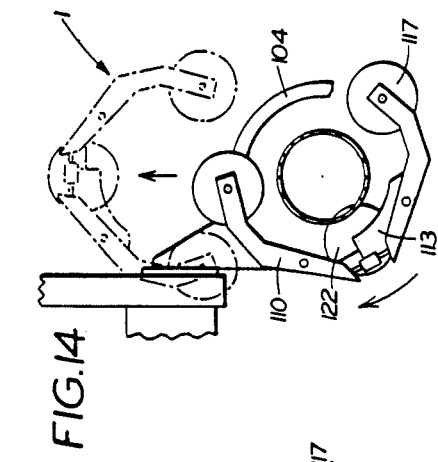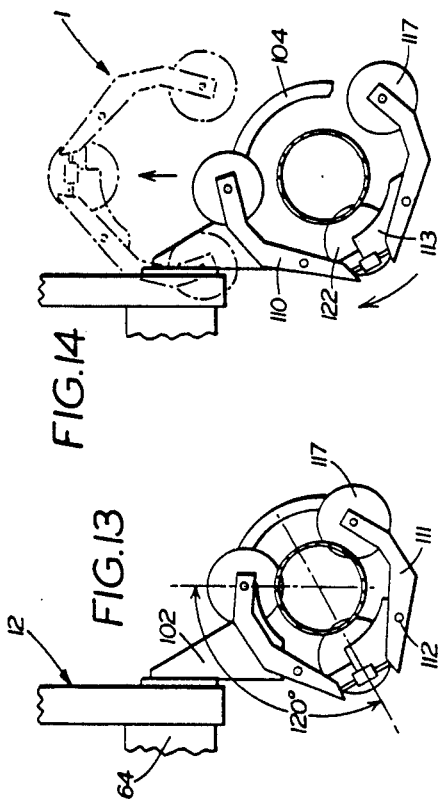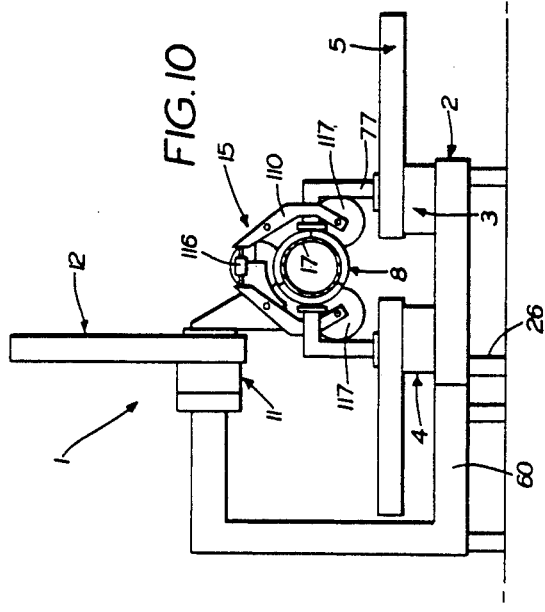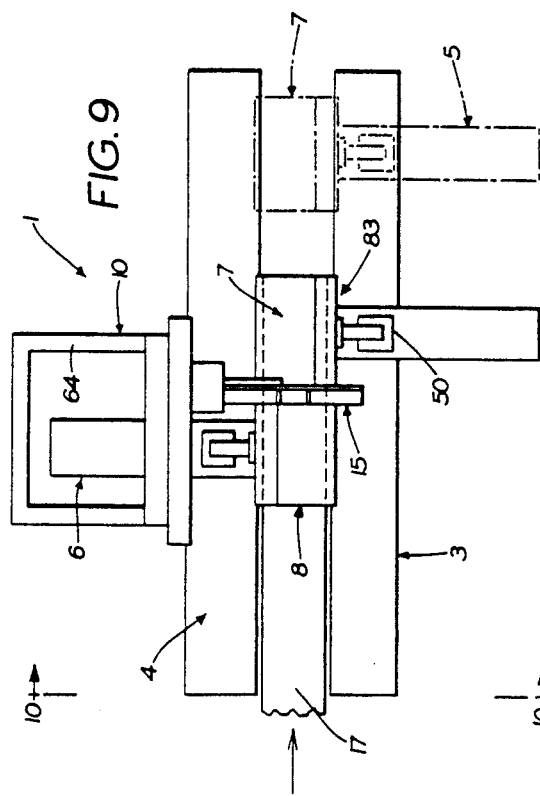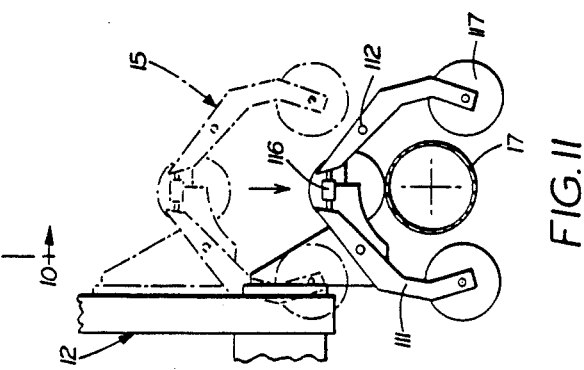

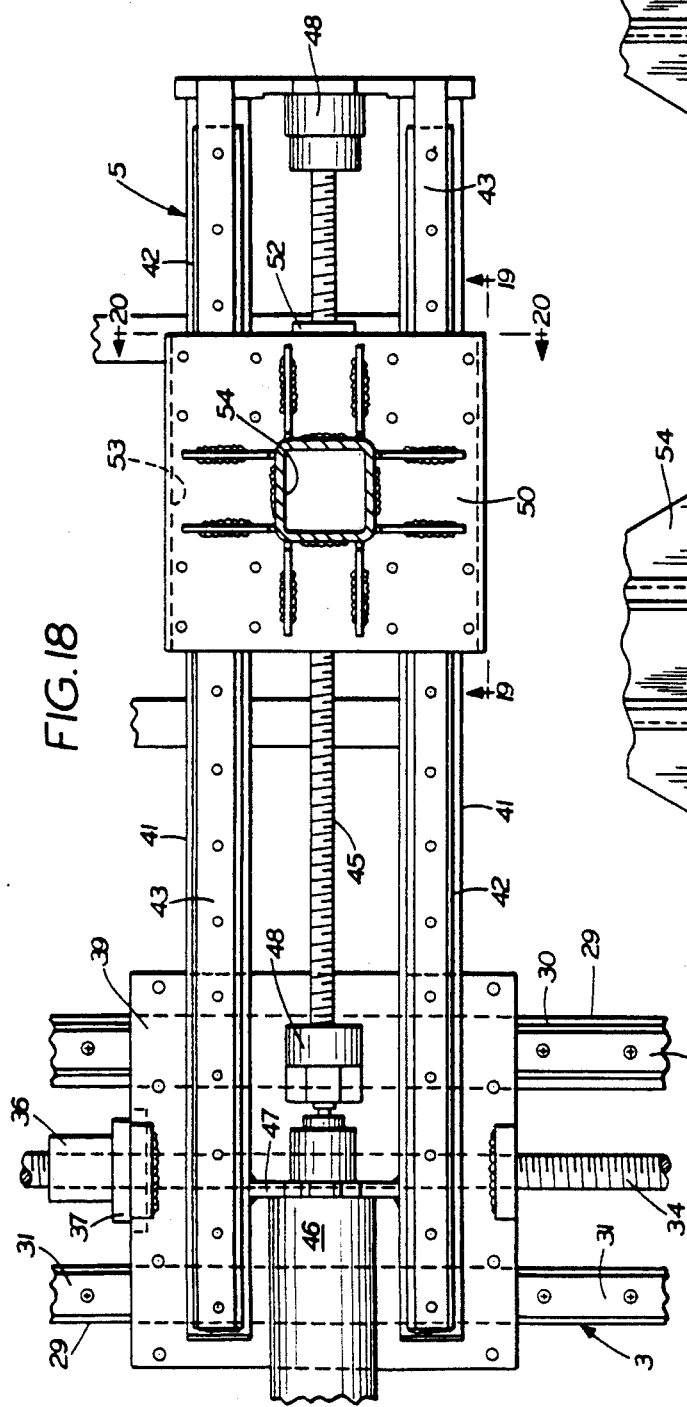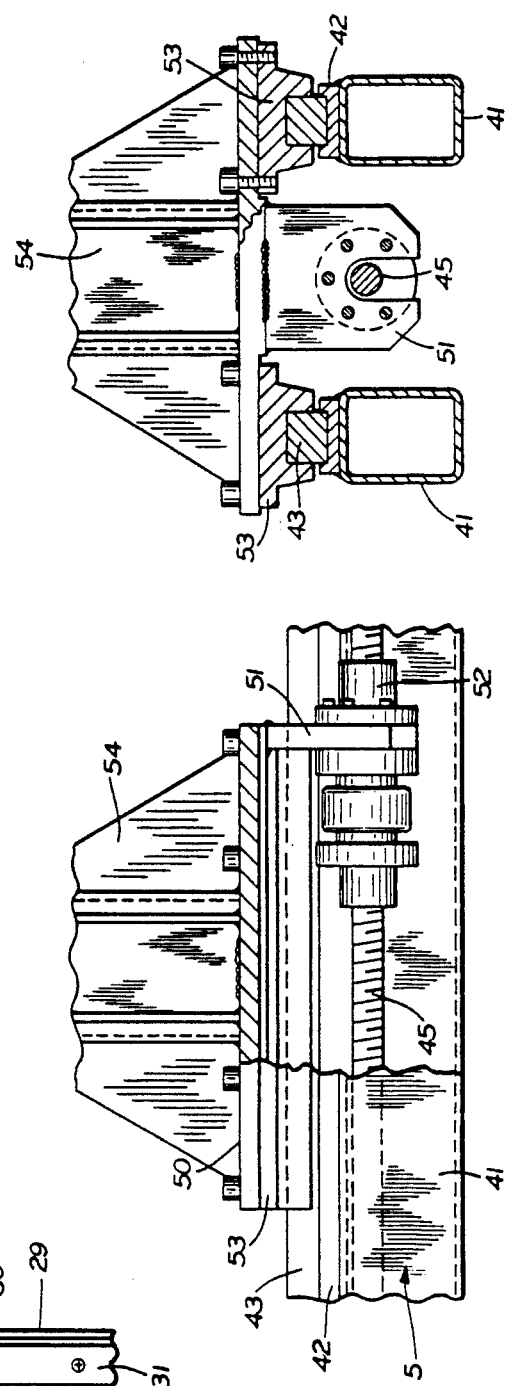

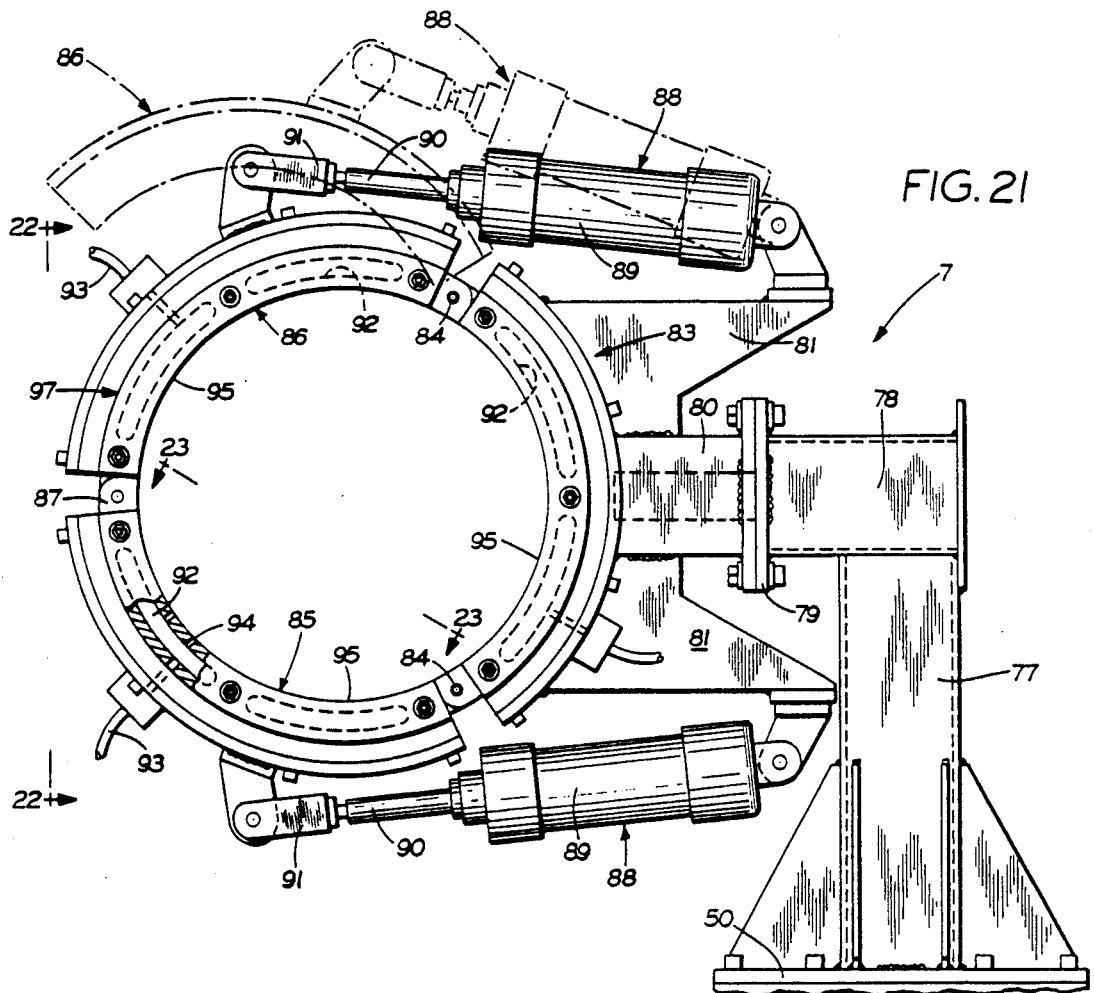
FIG. 21
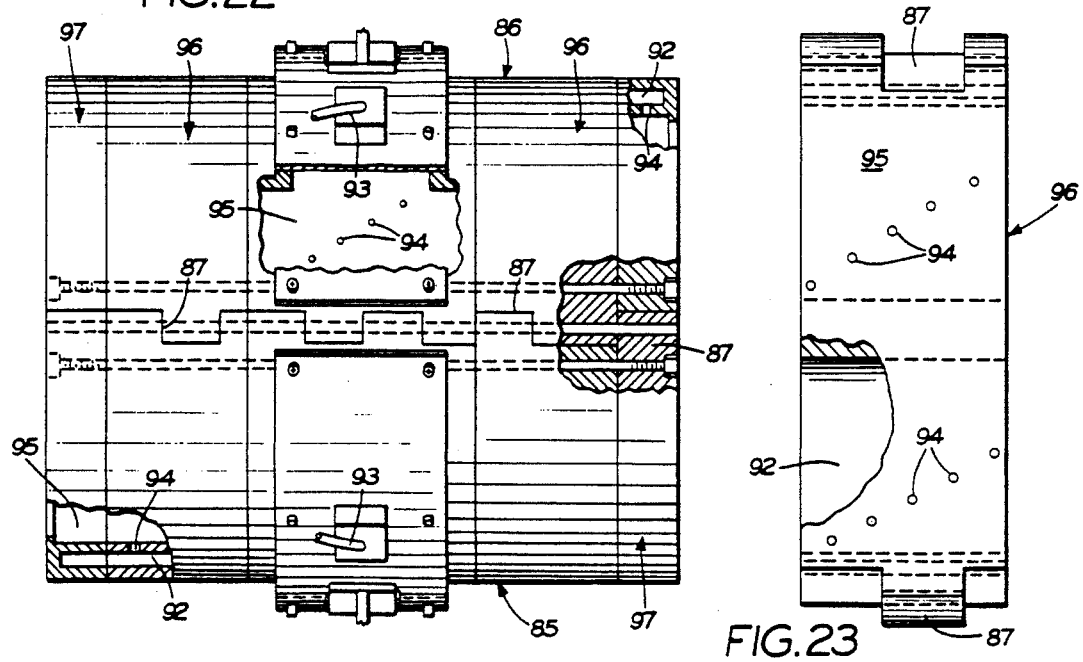
FIG. 22
FIG. 23

TUBULAR SLEEVE HANDLING AND CUT-OFF SYSTEM

TECHNICAL FIELD

The invention relates to a system, method and apparatus for handling a tubular extrudate of an elastomeric material preferably of the type used as a body ply element in the manufacture of pneumatic tires. More particularly, the invention relates to such a system, method and apparatus for moving the extrudate from an extrusion head along a production axis and severing a predetermined length sleeve from the extrudate while maintaining the tubular shape thereof and transporting the severed sleeve to a discharge station, preferably for incorporation into a continuous tire manufacturing operation.

BACKGROUND ART

Tubular components such as pneumatic tire body plies, have previously generally been built by utilizing woven fabric and calendering the same with rubber stock which, when cut to size, is wrapped about a tire building drum with overlapping ends to produce a tire carcass. The formation of the overlapping seam is generally disadvantageous in that, the discontinuity caused by the seam produces not only a lapped splice, but also an asymmetrical construction tending to cause a force unbalance in the completed tire and a sidewall undulation.

In order to avoid this lapped or seamed construction, extrusion has been employed in the prior art for producing a generally tubular elastomeric ply made up of concentric tubular streams of elastomeric material which provides a tubular extrudate, which when severed into predetermined axial lengths, provide a seamless body ply element. An example of such a coextrusion to form such a seamless body ply is shown in U.S. Pat. Nos. 4,657,718 and 4,578,024.

It is desirable for efficient and timely utilization of the produced seamless body ply that the ply be transferred to a new production station while retaining its geometry, that is, its cylindrical or tubular configuration without undesirable distortion or wrinkling since the extrudate will be in a relatively soft and heated state. To accomplish this, a system is required which can rapidly and accurately collect, envelop and separate the continuous tubular extrudate into predetermined axial length sleeves while moving the extrudate and the severed sleeve along a production axis enabling the extrudate to be positioned for subsequent cuts as the previously severed sleeve is moved to a discharge station for use in the tire manufacturing procedure. It is critical during the movement and cutting of the tubular extrudate to maintain a constant control of the configuration of the soft extrudate while providing a continuous movement thereof so as not to affect the overall continuous tire manufacturing procedure.

It is also necessary in providing such a satisfactory system, method and apparatus that gripper mechanisms be provided for effectively maintaining the shape of the extrudate and that a cutter mechanism be employed which provides a clean, smooth cut through the extrudate without tearing or deforming the cut edges thereof.

Various prior art devices have been used for gripping and moving heavy rigid tubular material and for cutting the same, and other prior art systems have been developed for performing operations on tubular materials. With respect to the overall handling and cut-off system, the following ten patents are believed to be examples of the closest known prior art.

U.S. Pat. No. 3,267,783 discloses a method and apparatus for handling and cutting extruded lead tubing which is used as sleeves for splicing cables. The apparatus includes a cutting mechanism, a two portion gripping mechanism, a transfer mechanism and a receiving mechanism, all of which are associative with an extrusion press. In operation, a continuous length of tubing is extruded from the top of a press and is clamped between the jaws of a clamping mechanism. The tubing travels through the jaws until a desired length of sleeve is severed. During cutting, a portion of the tubing held by the jaws is under tension with respect to the portion of the tubing below the cutting saw in order to prevent binding.

U.S. Pat. No. 4,339,868 discloses a system for automatically manufacturing plastic tubular elements having a feeder which feeds nylon tubes to a conveyor in combination with a cutter to cut predetermined lengths of tubing. Clamping jaws grasp the tube and move it to a spaced position where the tube ends are grasped by another pair of jaws.

U.S. Pat. No. 3,559,520 discloses a cutting saw machine with a clamping device wherein a saw can be moved longitudinally in a synchronized fashion. The jaws grip the leading end of the stock and the portion to be cut is held in a secure fashion to insure a clean cut therebetween by a rotatable saw which is movably mounted on a carriage.

U.S. Pat. 3,808,928 discloses a device for forming a tube and cutting the same in which the tube is gripped between jaws and is cut by a saw travelling on a guide.

U.S. Pat. No. 3,801,398 discloses a method for manufacturing tire inner tubes having air valves. The apparatus includes an extruder which delivers five parallel tubes to an upper portion of a conveyor. A cutting knife cuts five tubing portions from the extruded tubing. Each tubing portion is provided with an air valve and the cut portions are transferred to a delivery conveyor where the ends of each tubing portion are joined.

U.S. Pat. No. 3,982,980 discloses a method of extruding a resin tube by cutting off lengths of the tube to form a plurality of cartridge barrels. Barrel cylinders are formed by extruding a continuous length of relatively thin-walled resin tubing with constant inside and outside diameters. The extruded tubing is cut off in several generally known ways, i.e. by cutting apparatus which will move with the tubing and cut the tubing on the fly, or a cutting device which can momentarily stop the tubing after the cut is made.

U.S. Pat. No. 4,283,241 discloses an apparatus for forming radial ply tire carcass plies from a continuously produced tube from which axial sections are cut by cutting means. Folding rolls fold the projecting ends of the tube sections to form bead cores. A transfer device includes two radially movable gripper arms which extend into and engage the open ends of the tubular extrudate.

U.S. Pat. No. 4,492,136 discloses a cutting system for forming pipe casing in an apparatus which is designed to cut a generally circular cross-sectional pipe. The apparatus has two opposed cutters which are separated from each other by 180° and move from a central neutral position over approximately 90° in each direction so that upon rotation of the cutter they can complete a 360° circle about the pipe. The apparatus further includes a cutter assembly mounted on an annular trackway. After the pipe casing to be cut is positioned within a cutting area, cylinders are actuated to push and clamp the pipe against curved backwall stops of a fixed centering member. The cutter assembly is then moved into position which includes two opposed driven rotatable cutting blades which cut the pipe into predetermined lengths.

U.S. Pat. No. 3,044,336 discloses a method of cutting axially movable round bars. The apparatus includes a reciprocating carriage mounted on sidewalls of a bench frame. The carriage is provided with guide rails on which an auxiliary carriage is mounted for limited oscillating movement. A cutting device is carried on the auxiliary carriage and when a predetermined length of tubular member has passed through a supporting bench, the work is rigidly connected to the auxiliary carriage wherein the work will be under tension. After the tubular member is cut, the cutting tool returns to its inoperative position so that the work clamping mechanism will be relaxed and the carriages can be returned by a chain drive to their initial position.

U.S Pat. No. 4,484,966 discloses a method of manufacturing carcass bands reinforced by cords to form a radial tire. An axially movable mechanism is provided on a retaining pipe, downstream of which is located a severing machine which severs the hose at predetermined lengths by using either laser beams or rotary cutters. A pair of clamping members also are provided which are driven by reciprocating members for clamping the pipe. A second retaining mechanism which retains the severed hose, is moved axially forward of the retaining pipe, which is now secured by other clamp members, with the severed hose being transferred to a predetermined location. However, the extruded sleeve is not maintained in tension as it moves along its work path as is the extrudate of the present invention, but is permitted to become slack and distorted.

However, none of the devices set forth in the above patents disclose the specific arrangement of a cutter and two opposed clamps as in the invention described below, in which both the cutter mechanism and the clamping mechanism are designed to encircle the tubular material to be cut, or that the cutter mechanism extends axially within the tubular material and then rotated for severing the same.

The following five prior art patents relate to cutting devices of the general type as set forth in the present invention:

U.S. Pat. No. 4,492,136 also discussed above, discloses two or more cutter sections which can comprise less than 360° individually, but together can be rotated over 360° to effect a complete cut about a tubular element.

U.S. Pat. No. 3,249,998 discloses a pipe cutter having a plurality of disc cutters. The cutter includes a clamping member having a pair of adjacent parallel diverging arms. A pivotal connection between one end of the arm and a spacer permits the clamping member to be pivoted into its correct position. Aligned openings in the arms provide clearance to receive a shaft on which a cutter wheel or discs are rotatably supported. The cutter discs act to cut the walls of the pipe in response to rotation of the cutter unit.

U.S. Pat. No. 3,456,856 discloses a pipe cutting tool which includes four arcuate segments mounted on an inner ring and four additional segments mounted on an outer ring. A plurality of cutters are forced into a pipe to produce a series of uniform indentations about the pipe. Both of the rings are separately hinged so they can encircle a pipe before cutting. A cylinder rotates the outer ring structure relative to the inner ring structure to pivot the cutters and produce a smooth fracture in a cutting operation.

U.S. Pat. No. 4,175,455 discloses a cutting device for cutting a block of continuously extruded urethane foam. The apparatus includes an infeed conveyor and a stationary cutting platen positioned at the end of the conveyor. As the foam moves on the conveyor in a longitudinal direction, it is cut over the platen into a plurality of sections which are taken away by an outfeed conveyor. A cutter saw assembly moves longitudinally and vertically to completely cut the foam when over the platen. The saw first moves longitudinally at the same speed as the conveyor and then moves downwardly while still moving longitudinally to effect a cut.

Russian Patent No. 148,743 discloses an "on the fly" type cutter for cutting pipes after they are extruded. The apparatus includes a plurality of cutting blades arranged to encircle the pipe, with one end of each blade being pivotally mounted on a ring capable of rotating about a horizontal axis. The other end of the blades are attached to sliding elements which are arranged for sliding in radial guides in a sleeve rigidly mounted to the cutting apparatus.

None of these five patents disclose the precise structure of the external cutter of the present invention; insofar as none of them include two pivotable cutting heads which are movable in addition to a stationary central cutting head. Furthermore, none of these patents show a cutter which extends axially and rotationally within the tubular extrudate for severing the same.

The following two patents are pertinent with respect to the particular gripping apparatus and mechanism of the present invention:

U.S. Pat. No. 4,484,966, also discussed above, utilizes two retaining mechanisms, each having a plurality of suction grippers in the form of vacuum cups. This mechanism has vacuum cups mounted on the inner end of radially movable piston rods. The outer portion of a cylindrical hose which is to be cut is attracted and retained initially by these vacuum cups.

U.S. Pat. No. 3,249,998, also discussed above, discloses a clamping member comprising pivotally connected adjacent arms which open to surround a cylindrical pipe prior to a cutting operation.

However, neither of these patents discloses a three part pivotal clamping mechanism having a stationary central member and two pivoting members which are designed to encircle an entire flexible tubular element.

DISCLOSURE OF THE INVENTION

The present invention provides a solution to the noted prior art problems in terms of apparatus, method and system by handling a generally thin, flexible tubular elastomeric ply in such a manner as to prevent distortion thereof after it leaves an extrusion head and then cutting off predetermined sleeve lengths of the elastomeric ply and delivering it to a discharge station while continuing to move the tubular extrudate forwardly along a production axis for performing a subsequent severing action thereon. The extrudate is moved from the extrusion head over an air floatation system to support the tubular geometry and to prevent distortion until gripped by a leading gripper.

In terms of operation, a first or leading gripper is engaged with and moves the tubular extrudate along a production axis while applying tension thereto. The axial length of the gripper preferably equals the length of the sleeve to be severed from the extrudate minus the space required for the cutting operation. Thus, different lengths of sleeves can be severed from the extrudate by providing different length grippers and suitably programming the cutter control software. Upon travel of the extrudate equivalent to the length of the desired sleeve, a second or trailing gripper comes into contact with and engages the extrudate behind the first gripper. The second gripper also imparts a tension on the extrudate with the sum of the tensions of the two grippers preferably equalling a constant. As the tension of the trailing gripper increases, the tension of the leading gripper will decrease correspondingly. This will be accomplished via software control of appropriate control circuits. Any tension between grippers that exists during the cutting operation will decrease as the cutting progresses so that no tearing occurs, which tension decrease also is accomplished via software control.

Upon completion of the cut, the tension of the trailing gripper will be at a constant level while the first gripper transfers the severed product or sleeve to a discharge station or subsequent stage of assembly in a tire manufacturing system. Upon completion of the sleeve transfer, the leading gripper returns to its start position and becomes the trailing gripper and the cycle is repeated.

A minimum of two grippers is required although an additional number may be introduced for purposes of reducing cycle time and serving more than one discharge station. The speed of the extrusion or delivery of the tubular extrudate is such that there is sufficient time for the leading gripper to transfer the severed sleeve to the discharge station and then move back to the start position before there has been an extrusion or movement of the extrudate of a length in excess of the required severed sleeve length. If desired, a third gripper can be utilized so that there will be no waiting time between the second gripper's return to its starting position.

The tensioning provided by the grippers has two functions, namely to permit extrusion control and to facilitate cutting under controlled tension. In addition, the grippers also perform the transport function of the severed sleeve to a discharge station. Vacuum holding ports are provided in the grippers. The vacuum holding grippers support the extrudate during movement to the cutter and during cutting operation and during movement of the severed sleeve, for retaining the configuration of the flexible sleeve throughout the handling and cutting process. After the transport of the severed sleeve the vacuum holding function is terminated via use of compressed air to cause the sleeve to be discharged by the gripper and deposited on a storage or building drum, or continuing on to the next stage of tire assembly.

One of the most important objectives obtained by the present system is the use of spaced gripper or clamping mechanisms which tension the material to be cut between the two grippers wherein the grippers envelop substantially the entire axial length and circumference of the tubular extrudate and the sleeve length cut therefrom.

Another objective of the invention is to provide such an improved cutting mechanism for use in the improved system which provides a clean, sharp, cutting line on the tubular extrudate preventing wrinkling or deformation of the cut edges.

The cutting mechanism is secured on a cutter mount and is vertically and horizontally movable on a pair of carriage assemblies. The cutting mechanism includes a curved segment that is capable of rotating at least 120° relative to the centerline axis or production axis of the extrudate by a plurality of V-shaped guide rollers. The segment is rotated by a motor-driven toothed belt which is connected to the ends of the segment. A central rotary cutter blade is attached to the segment and a pair of additional rotary cutter blades are pivotally mounted on the ends of the segment and are actuated via opposed pneumatic cylinders that utilize a spring return. Each of the cutter blades is driven via its own air motor. The cutter blades are spaced 120° apart and when coupled with at least 120° movement of the curved segment produces a 360° cut on the tubular extrudate.

The cutter mechanism is mounted on a carriage assembly which moves vertically down to a position above the tubular extrudate to be cut with all of the cutter's cutting blades rotating. The vertical carriage assembly continues to move until the center cutting blade, which is mounted stationary on the curved segment, contacts the sleeve while at the same time the two pivoting cutting blades are brought into contact with the extrudate. Thereafter, the cutting is initiated and the curved segment is rotated 120° to achieve the required 360° cut. During the cutting operation, the two spaced grippers and the interposed cutting mechanism are synchronized and move together on separate longitudinal axes along a main production axis. After completion of the cutting operation the two pivoting cutters are returned to their previous or at-rest position and the curved segment rotates back to its start position and the cutting mechanism is returned vertically and horizontally to a starting or home position for a subsequent cutting cycle.

In a modified cutter mechanism a pair of ultrasonic actuated cutting blades are pivotally mounted on an axially slideable carriage which is mounted on an end of a floatation system for the extrudate. The carriage moves axially within the extrudate to a position aligned with the gap between the spaced grippers, at which position the ultrasonic cutting blades are moved radially outwardly into cutting engagement with the extrudate and rotated through at least 180° to achieve the required 360° cut.

In accordance with another feature of the invention, each of the grippers is similar to each other and they are mounted on pedestals which are attached to cross-carriage assemblies which move transversely into and away from the tubular extrudate with the cross-carriages being mounted on longitudinally movable carriage assemblies which move horizontally along with and parallel to the production axis of the extrudate. Each of the grippers includes a fixed center gripper segment mounted on a pedestal and a pair of movable gripper segments pivotally mounted by hinges on the outer ends of the fixed segment. Pressure actuated cylinders pivot the outer gripper segments a distance sufficient to permit the grippers to move in and envelop completely about the length of the sleeve to be severed from the tubular extrudate. Each gripper segment has a manifold for applying a vacuum to the extrudate to hold it in position during transportation and cutting, and for receiving compressed air to release the severed sleeve upon reaching the discharge station.

These objectives and advantages of the invention are obtained by the improved system of the invention for handling and cutting-off a predetermined length sleeve of an elastomeric or reinforced elastomeric material from a generally tubular extrudate of said material, wherein said system includes leading and trailing gripper means for gripping and enveloping longitudinally spaced sections of the tubular extrudate and for moving said extrudate in the axial direction of said extrudate, said gripper means being movable longitudinally parallel and transversely with respect to the axis of said tubular extrudate, and enveloping the tubular extrudate throughout an axis length thereof generally equal to or less than the sleeve length of material to be cut therefrom cutter means for severing the extrudate between the spaced gripper means as tension is being applied to the extrudate by said gripper means, said cutter means being movable linearly with the axis of said tubular extrudate, and is rotationally movable about said extrudate axis when severing said extrudate to form the predetermined sleeve length which is gripped and enveloped by the leading gripper means; and means for selectively moving the gripper means and cutter means with respect to the extrudate to transport the extrudate in the axial direction and to return the gripper means to a home position for gripping another sleeve length of material of said extrudate after a sleeve of material has been severed from the extrudate and deposited at a discharge station.

These objectives and advantages are obtained further by the improved method of the invention for handling and cutting off a predetermined axial length sleeve of an elastomeric material from a general tubular extrudate of said elastomeric material, the general nature of said method including the steps of gripping and enveloping a leading section of the extrudate with first gripper means wherein said leading section has an axial length substantially equal to but less than the predetermined length of sleeve to be cut from said extrudate; moving said leading section of the extrudate in a forward axial direction and applying an axial tension on said extrudate; gripping and enveloping a trailing section of the extrudate with second gripper means wherein said trailing section has an axial length generally equal to the axial length of the leading section, severing the leading section from the trailing section by severing the extrudate between the first and second gripping means as said extrudate and gripping means are moving in the forward direction and tension is being applied to the leading section of the extrudate by the first gripping means, whereby said leading section forms said predetermined axial length of sleeve of extrudate; continuing moving the severed sleeve of extrudate by the first gripping means to a discharge station; and returning the first gripping means to a position trailing the second gripping means whereby said first gripping means is in a position to grip and envelop another trailing section of the extrudate as the second gripping means continues to move the extrudate in an axial forward direction and apply tension thereto prior to severing another sleeve from the extrudate.

BRIEF DESCRIPTION OF THE DRAWINGS

A preferred embodiment of the invention, illustrative of the best mode in which applicants have contemplated applying the principles thereof, is set forth in the following description and is shown in the drawings and is particularly and distinctly pointed out and set forth in the appended claims.

FIG. 1 is a diagrammatic top plan view showing the improved tubular sleeve handling and cut-off system of the invention located between an extrusion head discharging a tubular extrudate and an indexing storage mechanism for receiving the predetermined lengths of sleeve material severed from the extrudate;

FIG. 2 is a diagrammatic side elevational view of the sleeve handling system and apparatus of the invention looking in the direction of arrows 2—2, FIG. 1;

FIG. 3 is a diagrammatic perspective view, showing a sleeve length of the tubular extrudate severed from a continuous length of said extrudate by the improved system and method of the invention as shown in FIGS. 1 and 2;

FIG. 4 is an enlarged fragmentary sectional view of a typical coextruded reinforced elastomeric ply sleeve material of FIG. 3;

FIG. 5 is a diagrammatic top plan view showing the position of the two gripper assemblies at the start of an operational cycle in a retracted open position, with a front portion of the tubular extrudate moving into position between the grippers;

FIG. 6 is an end elevational view of the sleeve handling and cut-off system and apparatus of FIG. 5 with the tubular extrudate shown in section;

FIG. 7 is a diagrammatic top plan view similar to FIG. 5, with the leading gripper assembly gripping the forward end of the extrudate and the trailing gripper assembly in an open position prior to gripping the extrudate, with the cutter assembly being located between the two grippers;

FIG. 8 is a sectional view looking in the direction of arrows 8—8, FIG. 7;

FIG. 9 is a diagrammatic top plan view similar to FIGS. 5 and 7 showing the position of the gripper assemblies in closed position on the tubular extrudate and with the cutter assembly in cutting position, with a depositing gripper containing a severed sleeve length, shown in dot-dash lines, removed from tubular extrudate;

FIG. 10 is a diagrammatic sectional view taken on line 10—10, FIG. 9 showing the position of the gripper and cutter assemblies at the start of the cutting step;

FIG. 11 is a fragmentary diagrammatic view showing in full lines the position of the cutter assembly after being lowered into engagement with the tubular extrudate prior to closing of the outer two cutters, with the cutter assembly shown in dot-dash lines in a fully raised position;

FIG. 12 is a diagrammatic view similar to FIG. 11 showing the center and outer pivotally mounted cutter blades in cutting engagement with the tubular extrudate;

FIG. 13 is a diagrammatic view similar to FIGS. 11-12 showing the position of the three cutter blades after being rotated at least 120° at the end of the cutting sequence;

FIG. 14 is a diagrammatic view similar to FIGS. 11-13 showing the opening movement of the cutter assembly after performing a cutting operation and the subsequent upper movement of the open cutter assembly to its raised position as shown in dot-dash lines;

FIG. 18 is an enlarged fragmentary view with portions broken away and in section, showing one of the cross-carriage assemblies for the gripper assemblies mounted on its associated longitudinal carriage;

FIG. 19 is an enlarged fragmentary sectional view taken on line 19—19, FIG. 18;

FIG. 20 is an enlarged fragmentary sectional view taken on line 20—20, FIG. 18;

FIG. 21 is an enlarged fragmentary view with portions broken away and in section, showing one of the gripper assemblies in full line closed position with one of the pivotally mounted gripper sections shown in dot-dash lines in open position, FIG. 22 is a fragmentary end elevational view looking in the direction of arrows 22—22, FIG. 21, of one of the gripper assemblies, with portions broken away and in section;

FIG. 23 is a fragmentary elevational view with portions broken away and in section, looking in the direction of arrows 23—23, FIG. 21;

Similar numerals refer to similar parts throughout the drawings.

BEST MODE FOR CARRYING OUT THE INVENTION

Figure 15:
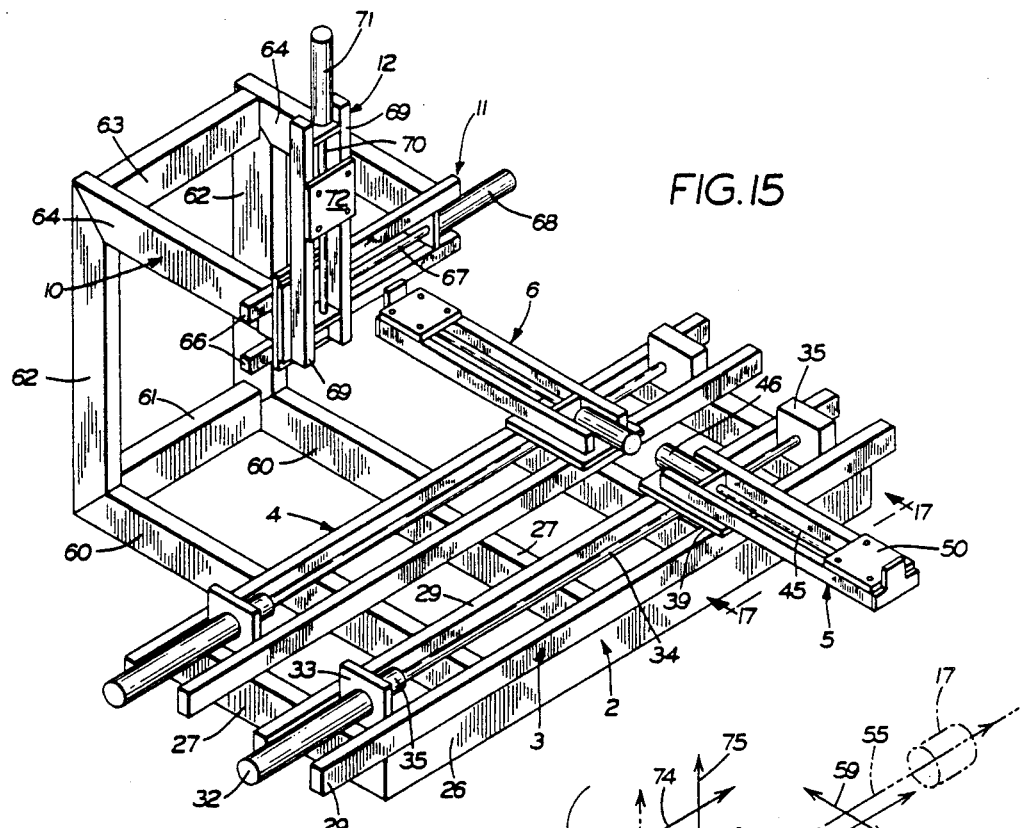
FIG. 15 is a diagrammatic perspective view showing the machine bed, longitudinal carriage assemblies and cross-carriage assemblies for movement of the gripper assemblies, and the vertical and horizontal carriage assemblies for movement of the cutter assembly.

The improved tubular sleeve handling and cut-off system of the invention, and in particular the apparatus for performing the same is indicated generally at 1, and is shown diagrammatically in FIGS. 1, 2 and 5–14. The apparatus also is shown carrying out the improved method steps of the invention, that is, the handling of a tubular extrudate and cutting off predetermined sleeve lengths thereof and transporting the same to a discharge station.

The improved apparatus includes broadly a machine bed indicated generally at 2 (FIG. 15), on which is supported a pair of longitudinal or main carriage assemblies indicated generally at 3 and 4. Carriage assemblies 3 and 4 have cross-carriage assemblies 5 and 6, respectively, mounted thereon for movably supporting gripper assemblies indicated generally at 7 and 8 (FIGS. 21-23), and a cutter mount indicated generally at 10, for supporting a horizontal carriage assembly and vertical carriage assembly indicated generally at 11 and 12, respectively. A cutter assembly indicated generally at 15 (FIGS. 24–29) is mounted on vertical carriage assembly 12 of the cutter mount.

These main components and assemblies of improved apparatus 1 are described separately in detail below, followed by their subsequent manner of operation for carrying out the improved method steps of the invention.

Referring to FIGS. 1 and 2, apparatus 1 is shown located between a coextrusion head 16 which produces a generally tubular elastomeric ply or extrudate 17 of the type shown in FIGS. 3 and 4. Extrudate 17 consists of coextrusions of elastomeric material 18 having a circular array of uniformly spaced individual reinforcing elements 19 embedded therein, such as natural or synthetic textiles, steel wire or fiberglass etc., which among other applications, may be used as a ply in forming the carcass of a pneumatic tire. Extrudate 17 is cylindrical as shown in FIG. 3. FIG. 4 shows side wall 25 of extrudate 17 as being relatively thin with respect to the overall diameter of the extrudate, thus providing an extremely flexible member, the configuration of which must be maintained to prevent it from deforming during movement through apparatus 1 and the severing of the predetermined axial length sleeve therefrom.

Coextrusion head 16 may be of the type as shown in U.S. Pat. No. 4,657,718 and will include a piston-cylinder apparatus 20 and a pair of additional fluid pressure operated piston and cylinder devices 21. A pair of opposed delivery conduits 22 are mounted on coextrusion head 16 for supplying the elastomeric material therein which is coextruded about reinforcing elements 19, a plurality of which are directed and fed into coextrusion head 16, where they are embedded within the elastomeric material for forming extrudate 17 as shown particularly in FIGS. 3 and 4. An air floatation system (not shown) supports the extrudate as it leaves head 16. This floatation system consists broadly of a cylinder having a diameter slightly smaller than the internal diameter of extrudate 17 which is supported from head 16 into the interior of the extrudate and is surrounded by a flow of air which supports the extrudate just out of contact with the air floatation inner cylinder.

A storage or indexing mechanism 23 is shown on the opposite or discharge end of apparatus 1 and provides a plurality of cylinders 24 for slideably receiving a sleeve of the elastomeric material severed from extrudate 17 at the end of a cut-off cycle for cooling and for future use in a tire building procedure. Coextrusion head 16 and storage mechanism 23 are equipment well known in the art and do not form a particular part of the invention described and set forth below.

Carriage Assemblies

Figure 17:
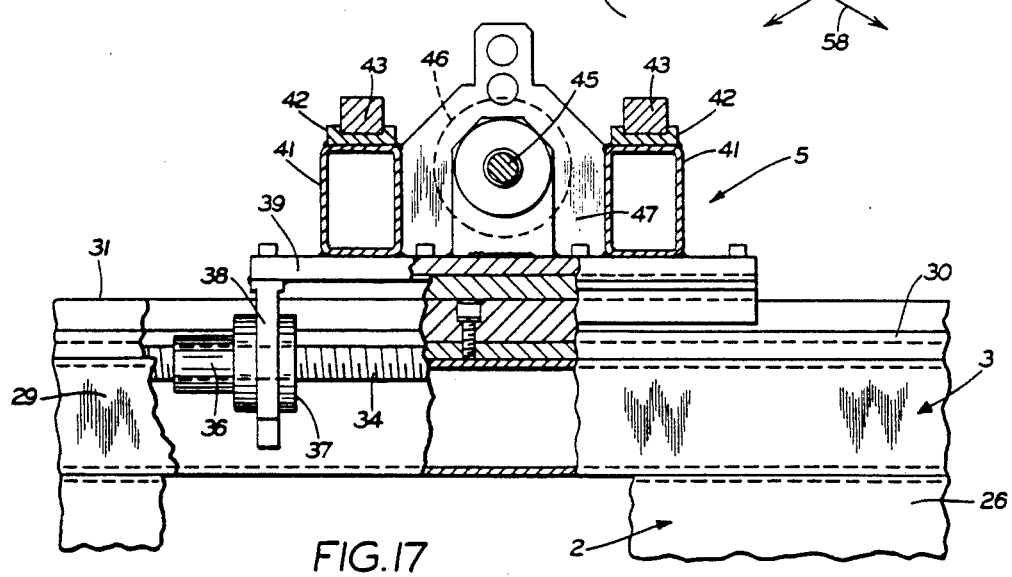
FIG. 17 is an enlarged fragmentary sectional view taken on line 17—17, FIG. 15, showing the drive means for one of the longitudinal carriage assemblies and mounting of the cross-carriage assemblies thereon for one of the gripper assemblies.

Referring to FIG. 15, machine bed 2 is formed by a plurality of longitudinally extending box frame members 26 connected by a plurality of laterally extending box frame cross-members 27. Longitudinal main carriage assemblies 3 and 4 for supporting the gripper assemblies, are similar to each other and therefore only carriage assembly 3 is described in detail. Longitudinal carriage assembly 3 includes a pair of spaced parallel, horizontally extending box channel frame members 29 which are supported on machine bed 2. A linear bearing mounting channel 30 extends along the top surface of each frame member 29 (FIG. 18) and has a torsionally stiff linear bearing 31 mounted therein. A motor 32 is mounted in a fixed position on a support plate 33 at one end of the carriage for rotating a ball screw 34 which extends longitudinally along the carriage between spaced frame members 29 (FIG. 17). Ball screw 34 is supported in end bearings 35 and has a nut 36 movably mounted thereon which is fixed by a collar 37 to a yoke plate 38 which is welded to the bottom of a plate 39 (FIG. 17) which moves longitudinally along ball screw 34 of the carriage assembly. Thus rotation of ball screw 34 by motor 32 will move plate 39 longitudinally along linear bearings 31 which extend along the top of box channel frame members 29.

Cross-carriage assemblies 5 and 6 also are similar to each other and therefore only cross-carriage assembly 5 is described in detail and is shown particularly at FIGS. 17–20. Cross-carriage assembly 5 includes a pair of box channel frame members 41 which are welded to the top of plate 39. A linear bearing mounting channel 42 is attached to and extends along the top surface of each frame member 41 in which is supported a linear bearing 43. Another ball screw 45 extends along frame members 41 and is rotated by a motor 46 mounted on a support plate 47. Ball screw 45 is rotatably supported at both ends by bearings 48 in a usual manner well known in the art.

A pedestal base plate 50 (FIGS. 18–20) is slideably mounted on linear bearing 43 and is driven by ball screw 45 which is connected thereto by a yoke plate 51 and nut 52. Pedestal base plate 50 also has a pair of bearing channels 53 mounted on the bottom surface thereof as shown in FIG. 20, to provide the bearing engagement with bearings 43. A gripper mechanism support column 54 is welded to the top surface of pedestal base plate 50 and extends upwardly therefrom for supporting gripper assembly 7 which is described in detail below.

Figure 16:
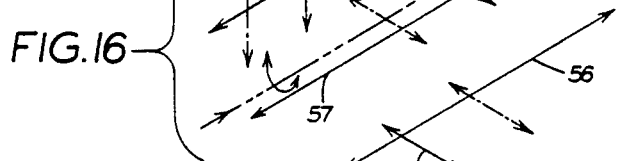
FIG. 16 is a diagrammatic view showing the horizontal, vertical and rotational movement axes of the gripper assemblies and cutter assembly by the various carriage assemblies as shown in FIG. 15.

Referring again to FIG. 15, longitudinal carriage assemblies 3 and 4 provide for longitudinal parallel linear movement of cross-carriage assemblies 5 and 6, respectively, which are movably mounted thereon. These cross-carriage assemblies in turn provide for linear horizontal transverse movement of pedestal base plates 50 on which are supported gripper assemblies 7 and 8. The directional movements of the various carriages are with respect to a main longitudinal production axis, indicated generally at 55, which coincides with the center-line axis of tubular extrudate 17. Referring to FIG. 16, the longitudinal movements of longitudinal carriage assemblies 3 and 4 are indicated by arrows 56 and 57, respectively, with the transverse movement of cross-carriage assemblies 5 and 6 being represented by arrows 58 and 59, respectively.

The cutter mount, indicated generally at 10 and shown particularly in FIG. 15, includes a pair of horizontal box frame members 60, a cross-end frame member 61, a pair of vertically extending frame members 62 connected by top horizontal cross-member 63, and a pair of outwardly projecting transverse box frame members 64 which are spaced above and parallel with bottom box frame members 60. Horizontal carriage assembly 11 of cutter mount 10 is similar to longitudinal carriage assemblies 3 and 4, in that it includes a pair of spaced box frame members 66 for mounting linear bearings and a ball screw 67 driven by a motor 68. The ball screw, in turn is connected to vertical carriage assembly 12, which also consists of a pair of frame member 69 with linear bearings and an intervening ball screw 70 driven by a motor 71. Ball screw 70, in turn is connected to a cutter assembly base plate 72.

Thus, carriage assemblies 11 and 12 provide for horizontal and vertical movement of cutter assembly 15 with the direction of movement being indicated by horizontal arrow 74 and vertical arrow 75, shown diagrammatically in FIG. 16. Thus, the directional movement provided by cutter assembly carriages 11 and 12 is similar to that provided by the gripper assembly carriages, and their particular movement paths are shown in FIG. 16 in relationship to the paths of movement of the gripper assembly carriages and production axis 55.

Gripper Assemblies

Gripper assemblies 7 and 8 are similar to each other and therefore only gripper assembly 7 is shown in detail, particularly in FIGS. 21–23, add is described below. Gripper assembly 7 includes a vertical support column 77 which is attached to and extends upwardly from pedestal base plate 50, which as discussed above is bearing mounted on cross-carriage assembly 5. A horizontally outwardly extending support beam 78 is secured to the top of column 77 and is connected by a bolted flange 79 to a base beam 80 which in turn is secured to a plate 81 and to a fixed arcuate-shaped stationary gripper segment indicated generally at 83. In accordance with one of the novel features of the gripper assemblies, a pair of arcuate gripper segments indicated generally at 85 and 86, are pivotally mounted by hinges 84 at the extended ends of fixed gripper segment 83. Movable gripper segments 85 and 86 terminate in stepped edges 87 which align and mate with each other when in a closed position as shown particularly in FIG. 22.

Gripper segments 85 and 86 are moved between a closed position as shown in full lines, and an open position as shown in dot-dash lines for segment 86 in FIG. 21, by fluid pressure devices indicated generally at 88. Pressure devices 88 preferably consist of a usual fluid cylinder 89 and a movable piston rod 90 connected by a clevis 91 to a lug attached to the respective gripper segment. Pressure devices 88 preferably are pneumatically operated and are dual action so as to positively move piston rods 90 and their connected gripper segments between open and closed positions. All three gripper segments 83, 85 and 86 are formed with internal manifolds 92 which are interconnected with each other, and are connected to a source of pressurized fluid or vacuum by supply lines 93. A plurality of ports 94 are formed in the gripper segments and extend between manifolds 92 and the interior arcuate curved surface 95 of each segment. The individual manifolds of the three segments are interconnected so as to have the same positive pressure and/or vacuum applied thereto, which in turn, is applied through ports 94 for either securing extrudate 17 against surfaces 95 when a vacuum is applied to manifolds 92, or for releasing the holding of the extrudate by the gripper segments when a positive fluid pressure is applied to the extrudate through ports 94.

Preferably each gripper segment has an internal arcuate length of approximately 120° whereby the three segments when in closed position, surround all 360° of the extrudate, thus securely supporting the same therein by the vacuum applied to manifolds 92 to prevent distortion of thin walls 25 of the extrudate.

In accordance of another feature of the gripper assemblies, the gripper segments are formed by a plurality of sections indicated individually at 96, and best shown in FIG. 23. Thus plurality of individual sections 96 can be joined in an axial relationship as shown in FIG. 22, which consists of three similar axial sections 96 and two outer end sections 97, to form the final gripper segments. This enables the gripper assemblies to have various axial lengths to accommodate various lengths of sleeves to be cut from continuous extrudate 17 to insure that the severed sleeve is supported substantially throughout its entire axial length to prevent distortion of the flexible thin wall of the extrudate. Thus, by adding or subtracting various sections 96 of predetermined axial length, the axial length of the gripper can match the particular sleeve length to be severed from the extrudate. Again each axial section 96 will be formed with the respective manifold 92 and ports 94 as discussed above.

Cutter Assembly

In accordance with another feature of the invention, cutter assembly 15 provides a mechanism which effects a clean and accurate cut through side wall 25 of extrudate 17 completely around the circumference thereof, in a rapid manner while the extrudate is moving axially along production axis 55 without wrinkling, tearing or deforming either the extrudate or the severed end of the sleeve cut from the tubular extrudate. Cutter assembly 15 is shown in detail in FIGS. 24–29.

Figure 29:
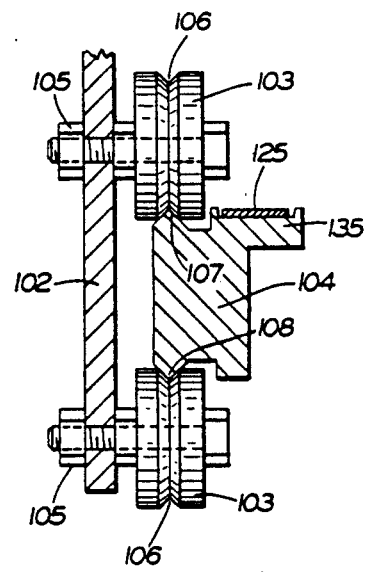
FIG. 29 is an enlarged fragmentary sectional view taken on line 29—29, FIG. 28.

As discussed above, cutter assembly 15 is mounted on cutter base plate 72 which is slideably mounted on vertical carriage 12 of cutter mount 10 as shown particularly in FIG. 15. Cutter assembly 15 is mounted on base plate 72 by a pedestal indicated generally at 99, consisting of an attachment plate 100 which is secured to base plate 72, a vertically downwardly extending plate 101, and a flat roller mounting plate 102 which extends outwardly from plate 101. Eight V-grooved rollers 103 (FIGS. 27-29) are rotatably mounted on the lower end of plate 102 by bolts 105 for movably supporting an arcuate-shaped segment or plate 104. Each roller 103 is formed with a central V-groove 106 in which is seated V-grooved edges 107 and 108 of segment 104 (FIG. 29).

Figure 24:
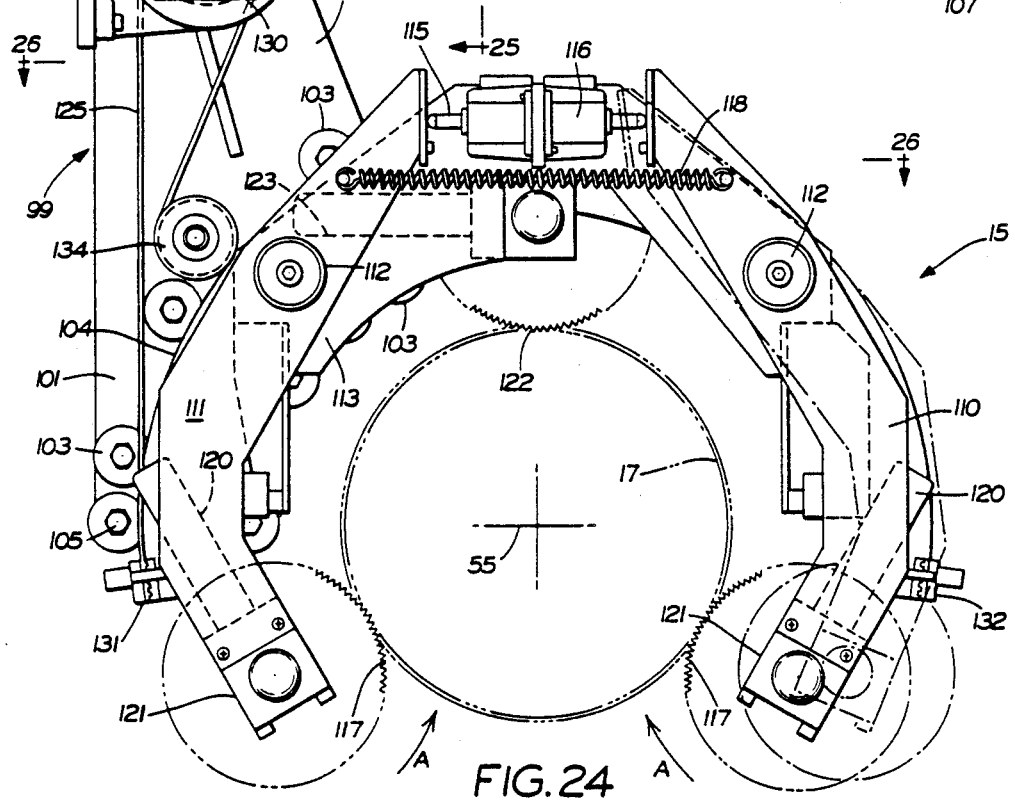
FIG. 24 is an elevational view of the cutter assembly in cutting position about the tubular extrudate shown in dot-dash lines between the three cutting blades in closed position.
Figure 26:
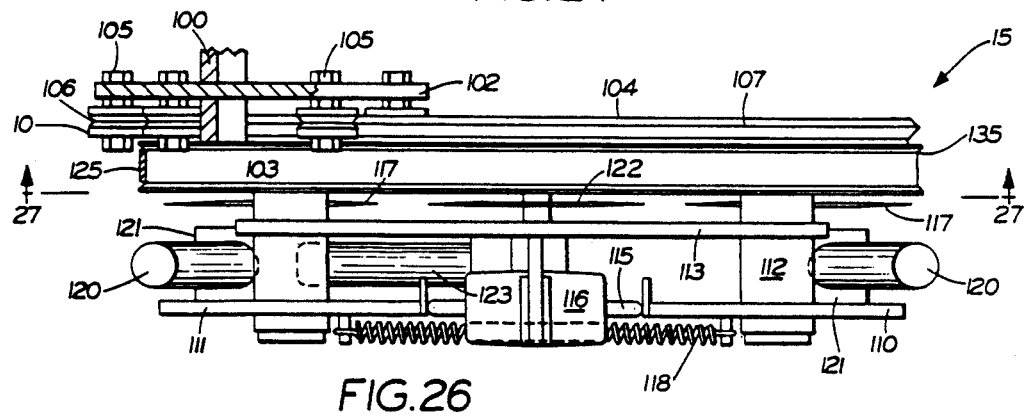
FIG. 26 is a fragmentary sectional view taken on line 26—26, FIG. 24.
Figure 27:
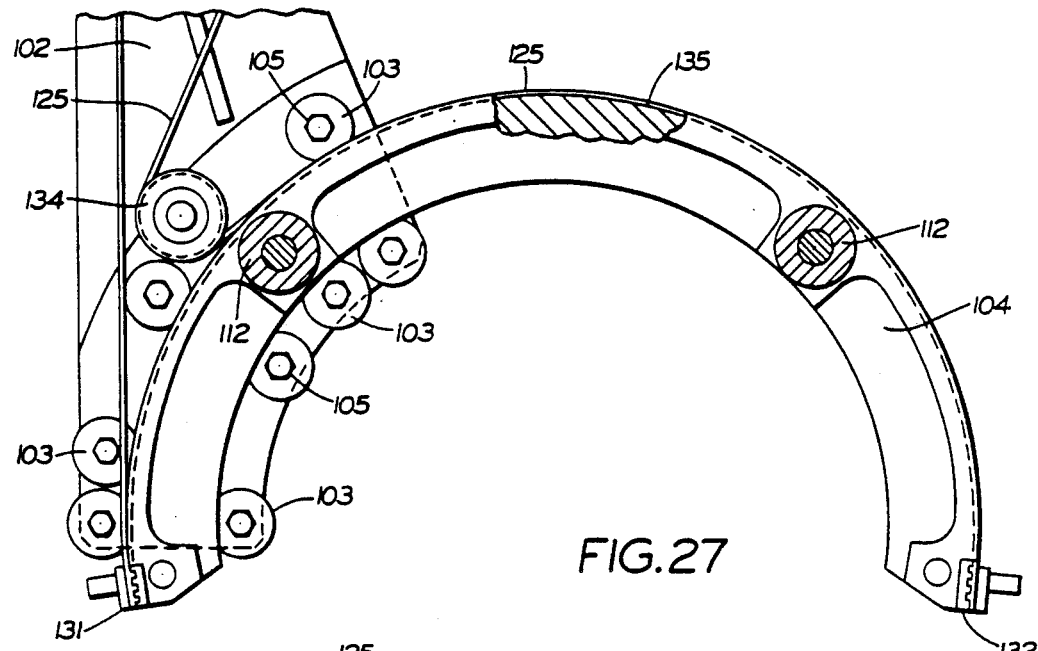
FIG. 27 is a fragmentary sectional view with portions broken away, taken on line 27—27, FIG. 26, showing the curved segment of the cutter assembly.
Figure 28:
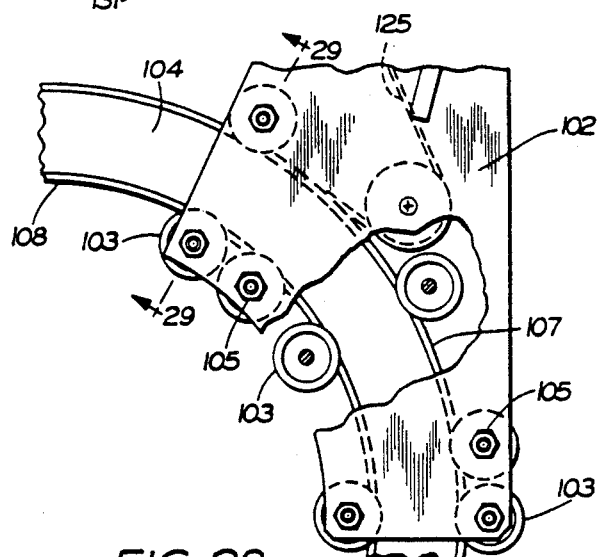
FIG. 28 is a fragmentary reverse view of the left-hand end portion of FIG. 27 showing the mounting of the curved segment on the pedestal plate and guide rollers of the cutter assembly.

A pair of arcuate-shaped cutter blade mounting arms 110 and 111 are pivotally mounted on annular bosses 112 which are formed on and extend outwardly from a base plate 113 which is mounted on segment 104 so as to be movable therewith. Arms 110 and 111 are pivotally mounted on bosses 112 so as to be movable as shown in FIG. 24 between inward and outward positions for cutting engagement with extrudate 17. The upper ends of cutter blade mounting arms 110 and 111 are engaged by pistons 115 which are moved by a fluid pressure cylinder 116. Actuation of pistons 115 will move circular cutting blades 117, which are rotatably mounted on the lower ends of arms 110 and 111, inwardly in the direction of arrows A (FIG. 24) and into engagement with extrudate 17. Arms 110 and 111 are spring biased by a coil spring 118 to the open or outward position shown in dot-dash lines in FIG. 24.

Cutting blades 117 are power driven by individual pneumatic motors 120 which are mounted on support blocks 121 located at the extended end of arms 110 and 111. An intermediate or third circular cutting blade 122 is rotatably mounted on base plate 113 and power driven by its own pneumatic motor 123 which is similar to motors 120. Intermediate cutting blade 122 is fixed with respect to arcuate segment 104 in contrast to cutting blades 117 which are movably mounted thereon by pivotally mounted arms 110 and 111.

Figure 25:
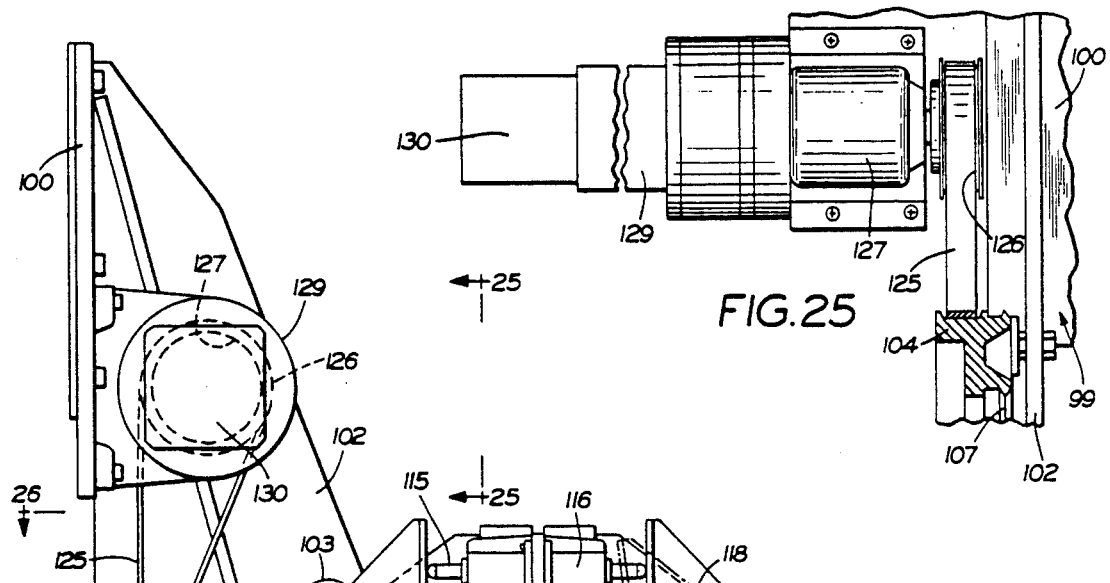
FIG. 25 is an enlarged fragmentary view with portions broken away and in section, looking in the direction of arrows 25—25, FIG. 24.

Arcuate segment 104 (FIGS. 27-29) is slideably mounted by rollers 103 on cutter assembly support pedestal 99 and actuated by a toothed timing belt 125. Belt 125 extends about a pulley 126 (FIG. 25) which is driven by a motor 127 mounted on pedestal 99 by a base plate 128. A motor brake 129 and encoder 130 also may be mounted on motor 127 as shown in FIG. 25 for performing various other functions in the operation of apparatus 1. One end of belt 125 is secured by a clamp 131 at the bottom of mounting plate 101 with the other belt end being fixed by a clamp 132 to a lower end of base plate 113 (FIG. 24). The belt extends along pedestal mounting plate 101, around motor driven pulley 126 and about a guide pulley 134 which is rotatably mounted on roller mounting plate 102, and extends along a channel 135 formed along the outer edge of segment 104 as shown particularly in FIGS. 27 and 29.

Upon rotation of motor pulley 126, belt 125 will move segment 104 along support rollers 103 through an arcuate distance of at least 120°. Segment 104 moves with it the three cutting blades and their associated motors including pivot arms 110 and 111 for blades 117. The bearing movement and mounting arrangement of segment 104 enables the cutting blades 117 and 122 to revolve about centerline axis 55 of extrudate 17 as shown in FIG. 24, to completely sever a predetermined length of material from extrudate 17.

Operation

The operation of the various assemblies and apparatus described above for carrying out the steps of the improved method of the invention are set forth below. Referring to FIG. 5, as extrudate 17 leaves extrusion head 16 it is supported by an internal mandrel or air floatation system, described previously, until it is gripped by one of the gripper assemblies 7 or 8. As shown in FIGS. 5 and 6 both gripper assemblies will be open and cutter assembly 15 will be in its vertically raised position. One of the grippers, assume gripper 7 for purposes of discussion, engages the extrudate as it leaves the extruder by moving from its open position, as shown in FIG. 6, to a closed position as shown in FIG. 8, completely enveloping the circumference of the extrudate by the pivotal movement of gripper segments 85 and 86 upon actuation of fluid pressure devices 88 as shown in FIG. 21. A vacuum is applied to manifolds 92 which draws the relatively thin cylindrical wall 25 of extrudate 17 securely against interior cylindrical surfaces 95 of the three gripper segments 83, 85 and 86. Furthermore, the gripper segments have an axial length slightly less or equal to the desired length of the sleeve to be severed from extrudate 17. This complete circumferential enveloping and axial gripping of the forward or leading end of extrudate 17 prevents any distortion of the elastomeric material which would occur if not completely supported due to the soft and pliable condition of the heated ply material as it leaves coextrusion head 16.

The first or leading gripper assembly applies tension to the extrudate as it travels outwardly from the extrusion head for a length equal to the length of the gripper assembly. The second or trailing gripper 8 then moves into engagement with the extrudate behind the leading gripper, leaving a minimum gap sufficient only for receiving the cutting blades 117 and 122 therebetween. When engaging extrudate 17, gripper assemblies 7 and 8 move inwardly toward the extrudate on their respective cross-carriage assemblies 5 ant 6 upon actuation of carriage drive motors 46. Simultaneously with this radial inward movement of the grippers assemblies on cross-carriage assemblies 5 and 6, the cross-carriages also will be moving longitudinally parallel with production axis 55 on their respective longitudinal axes 56 and 57 upon actuation of ball screw drive motors 32.

The two gripper assemblies together apply a constant tension on the extrudate which is controlled via appropriate software. As tension is applied by the gripper assemblies, cutter assembly 15 is lowered from its open raised position as shown in FIGS. 6 and 8 downwardly to the position as shown in FIG. 11, by actuation of motor 71 mounted on vertical carriage 12 (FIG. 15), in which position fixed cutting blade 122 contacts extrudate 17. The cutter assembly and two gripper assemblies move in a synchronized fashion each along their separate longitudinal axes represented by arrows 56, 57 and 74 in FIG. 16. During this longitudinal movement, cutting of the extrudate occurs by virtue of at least 120° rotation of segment 104 of cutter assembly 15 by the actuation of motor 127 and resulting movement of timing belt 125.

The cutter assembly encompasses approximately 300° as shown in FIG. 24 and by the rotational movement of segment 104 through at least 120°, will produce a 360° cut about extrudate 17 due to the equal 120° spacing of cutting blades 117 and 122. As the cutter assembly is lowered vertically into engagement with extrudate 17 by vertical carriage 12, all three cutting blades will be rotating. After cutting is initiated the segment 104 is rotated through at least 120°. Prior to this 120° rotation, the two pivotally mounted cutter blades 117, which are rotating, are brought into engagement with the extrudate as shown in FIG. 12 by actuation of cylinders 116 and associated pistons 115.

After severing tubular extrudate 17, the two pivoting cutter arms 110 and 111 and blades 117 are pivoted outwardly to the open position as shown in FIG. 14, counter rotated to the rotational home position and begin to ascend upwardly. The arms are rotated back to their starting or home position by the reverse movement of segment 104 so as to be in position for the next cutting cycle. Cutter assembly 15 will be moving longitudinally on its horizontal cross-carriage assembly 11 simultaneously with the rotational movement of the cutter blades through at least 120° arc and the counter rotation thereof. The extrudate continues to move along production axis 55 under tension of the upstream gripper assembly. Again the controlled movement of the cutter horizontal and vertical carriages and rotation of segment 104 is coordinated via computer software.

After the sleeve is severed from extrudate 17 as shown in FIG. 14, and completely contained within the previously leading gripper assembly indicated at 7 in FIG. 9, it is transported by its supporting gripper assembly along its longitudinal carriage assembly and subsequently deposited on a cylinder 24 of a storage mechanism 23 (FIGS. 1 and 2). In certain manufacturing systems it may be carried by additional apparatus directly to a tire building drum. As the sleeve of severed material is being transferred by the leading gripper assembly to a discharge station at the right hand end of the apparatus when referring to FIGS. 1 and 2, the other gripper assembly which still grips the now forward end of the extrudate, continues to move longitudinally forwardly a sufficient distance to enable the previous leading gripper assembly 7 to return via its cross and longitudinal carriage assemblies to a position adjacent the extrusion head 16 where it now grips the extrudate downstream of gripper 8 at a minimum gap of approximately ¼ inch. Both gripper assemblies continue to move horizontally on their respective longitudinal carriage assemblies with the minimum gap formed therebetween, for the next cutting steps by cutter assembly 15.

As discussed previously, the severed sleeve of material is released easily from within the gripper assembly by the introduction of compressed air into manifolds 92 through ports 94 releasing any adhesion between the extrudate and interior curved surfaces 95 of the gripper assembly.

Thus, the improved apparatus provides a tubular sleeve handling and cut-off system for use with a continuously produced tubular extrudate, which system utilizes at least one cutting device interposed between successive ones of at least two adjacent longitudinally movable gripper assemblies, all movable on pluralities of individual longitudinal axes parallel to the production axis of the extrudate, as shown particularly in diagrammatic fashion in FIG. 16. If desired, a third gripper assembly can be mounted on separate longitudinal and cross-carriage assemblies, preferably positioned vertically above production axis 55, and would function in the same manner as gripper assemblies 7 and 8 to provide increased production speed by insuring that a gripper assembly is always at the discharge end of extrusion head 16 without having to wait for the severed sleeve to be released at the discharged station and the associated gripper assembly returned to the start position.

The novelty of the present system and method resides particularly in the use of the spaced clamping or gripper assemblies which tension the material to be cut between the two gripper assemblies, wherein the gripper assemblies envelop substantially the entire axial length and circumference of the sleeve of material to be cut from the continuous extrudate, to maintain the thin-walled extrudate in its extruded form. Also, the improved system uses a novel cutter assembly which has two pivotally mounted cutting blades located on both sides of a fixed cutting blade, all of which are spaced 120° apart about a center axis, which axis aligns with the production axis of the extrudate during the rotational movement of the three cutting blades through a motion of at least 120° to completely sever the extrudate by a 360° cut.

Furthermore, the improved apparatus uses at least two unique three part pivotal gripper assemblies, which assemblies each includes a stationary arcuate segment and the two pivoting outer arcuate segments which envelop the entire flexible elastomeric extrudate and extend throughout the full axial extent thereof to prevent distortion. The controlled tension exerted on the extrudate by gripper assemblies 7 and 8 during the cutting operation insures a clean cut, and when accurately controlled prevents tearing of the extrudate at the severed location.

The invention of the apparatus and system as described are particularly useful with respect to an elastomeric ply material used in the manufacture of pneumatic tires. However such apparatus and method are also adaptable for use with other thin wall highly flexible tubular materials which need to be cut into predetermined axial lengths for subsequent use. Also, circular cutting blades 117 and 122 described above and shown in the drawings, could be easily replaced with ultrasonic cutting blades which would be rotated through the same at least 120° arcuate distance as accomplished by arcuate segment 104 without effecting the concept of the invention. Furthermore, other types of carriage transport mechanisms could be utilized to provide the simultaneous controlled longitudinal and transverse movement of the gripper assemblies and cutter assembly, rather than the ball screw arrangements shown in the drawing and described above.

Figure 30:
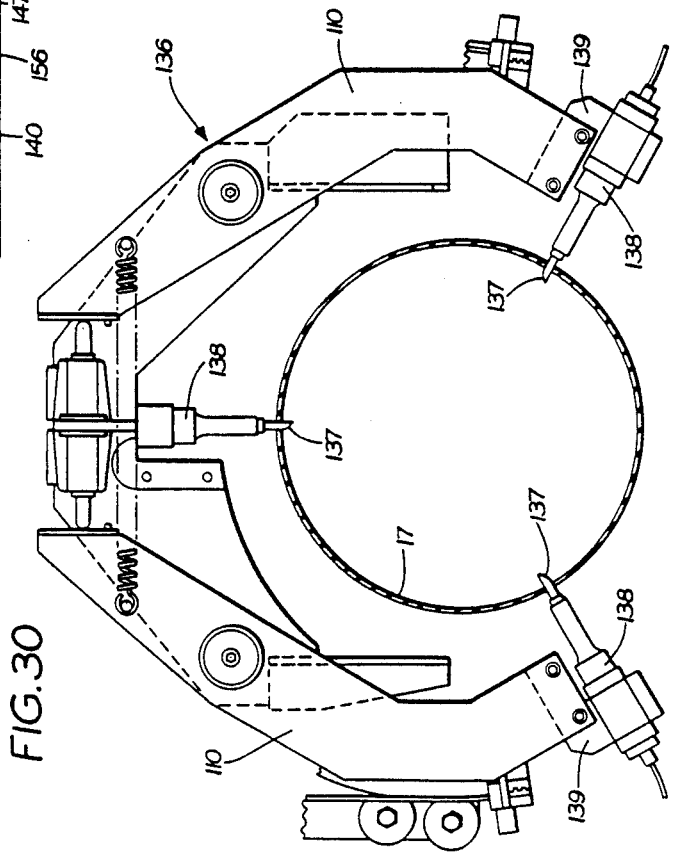
FIG. 30 is a fragmentary view similar to FIG. 4 showing ultrasonic driven cutting blades.

A modified cutter assembly is indicated generally at 136 and is shown in FIG. 30. Modified assembly 136 is similar to assembly 15 described above and shown particularly in FIG. 24 with the main difference being the use of ultrasonic actuated cutter blades 137 which are reciprocated by ultrasonic transducers 138. Transducers 138 are mounted in holders 139 which are attached at the extended ends of arcuate-shaped arms 110. The operation of modified cutter assembly 136 is similar to assembly 15 described above, except that cutter blades 137 are driven at an extremely high speed by ultrasonic transducers 138 for severing the extrudate 17 as the assembly is rotated through at least 120° arcuate rotation. The remaining features and components of modified assembly 136 are similar to that of assembly 15 and, therefore, are not described in detail.

Figure 31:
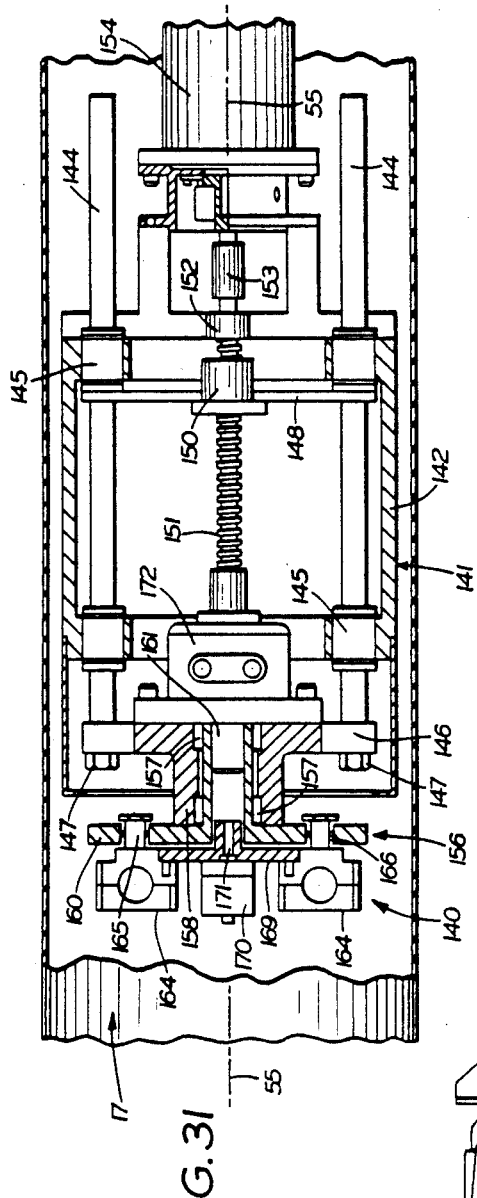
FIG. 31 is a sectional view showing a modified cutter assembly movably mounted within the extrudate with the cutter blades removed therefrom.
Figure 32:
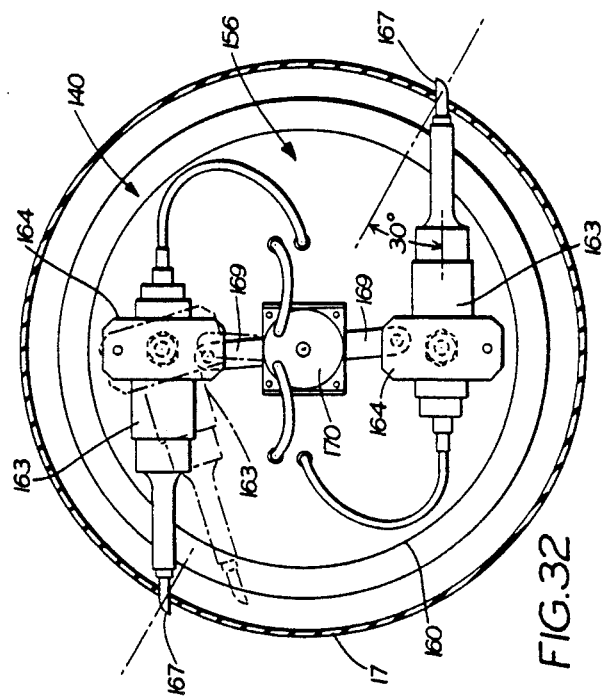
FIG. 32 is an end elevational view of the modified cutter assembly of FIG. 31 with the cutting blades shown in cutting position.

Further modified cutter assembly is indicated generally at 140, and is shown particularly in FIGS. 31 and 32. Modified assembly 140 is adapted to be located within the interior of extrudate 17 and moved axially along the production axis 55 in coordinated movement with the gripper assemblies for severing the extrudate at the gap between the gripper assemblies as discussed above with respect to cutter assembly 15. Modified assembly 140 is adapted to be mounted on the forward end of the air floatation system (not shown) which was described previously and which extends outwardly from the coextrusion head 16.

Modified cutter assembly 140 includes a carriage assembly indicated generally at 141, which includes a fixed base 142 which is attached to the air floatation system components and extends forwardly therefrom coaxially with production axis 55. A pair of linear bearings 144 is slideably mounted within a plurality of spaced bearings 145 which are mounted on base 142. A mounting plate 146 is mounted on the forward ends of linear bearings 144 and secured thereon by nuts 147. A rear cross brace 148 extends between linear bearings 144 and has a ball nut 150 mounted thereon which engages a ball screw 151. Ball screw 151 is supported by a rear bearing 152 and is connected by a coupler 153 to a servo drive motor 154.

A cutter blade support plate indicated generally at 156, is rotatably mounted by a pair of spaced bearings 157 within the interior of cylindrical-shaped forward portion 158 of mounting plate 146. Support plate 156 includes a circular-shaped pivot plate 160 and a cylindrical hub portion 161 which is engaged with bearings 157 for rotatably mounting pivot plate 160 with respect to the movable carriage assembly. As can be seen in FIG. 31, actuation of ball screw 151 by servo drive motor 154 will move cutter blade support plate 156 linearly coaxially along production axis 55 within the inner periphery of extrudate 17.

A pair of ultrasonic transducers 163 (FIG. 32) are mounted in holders 164 which are pivotally mounted by pins 165 (FIG. 31) within openings 166 formed in pivot plate 160. Cutter blades 167 are mounted on each ultrasonic transducer 163 for high speed reciprocation movement thereby in a manner well known in the art.

A pair of eccentrically mounted links 169 are connected to cutter blade holders 164 at their extended ends, and are moved by a encoder 170 mounted on a shaft 171 which extends through the interior of cylindrical hub 161 of pivot plate 160, and which is controlled by a rotary actuator 172.

The operation of modified cutter assembly 140 is as follows: Actuation of servo drive motor 154 will rotate ball screw 151 and will move the cutters longitudinally coaxially within the interior of extrudate 17 until cutter blades 167 are properly aligned with the gap between the pair of gripper segments 85 and 86 as described previously. Motor 170 will then pivot transducers 163 outwardly as shown in FIG. 32 by links 169, bringing cutter blades 167 into engagement with extrudate 17. Cutter blade support plate 156 is then rotated by rotary actuator 172 through an arc of at least 180° simultaneously with the actuation of cutter blades 167 by ultrasonic transducers 163 to provide a 360° cut of the extrudate. Upon completion of the cut, the cutter blades and transducers are pivoted away from contact with the extrudate enabling the gripper segments to continue their programmed movement as described above. Carriage assembly 141 can then return to its home position for the next cutting cycle at which time it will again move forwardly along production axis 55 until the cutting blades are again properly aligned with the gap between the movable gripper segments.

It is also easily seen that ultrasonic driven cutting blades 167 could be replaced with other types of power actuated cutting blades without affecting the results achieved by the cutter mechanism axially movably mounted within the interior or the tubular extrudate.

Accordingly, the improved tubular sleeve handling and cut-off system is simplified, provides an effective, safe, inexpensive, and efficient apparatus and method which achieve all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tubular sleeve handling and cut-off system is constructed and used, the characteristics of the con- struction and method steps, and the advantageous, new and useful results obtained; the new and useful structures, devices, elements, arrangements, parts, combinations and method steps, are set forth in the appended claims.

What is claimed is:

1. A method for handling and cutting off a predetermined axial length sleeve of an elastomeric material from a generally tubular extrudate of said elastomeric material, said method includes the steps of:
   (a) gripping and enveloping a leading section of the extrudate with first gripper means wherein said leading section has an axial length substantially equal to the predetermined length of sleeve to be cut from said extrudate;
   (b) moving said leading section of the extrudate in a forward axial direction and applying an axial tension on said extrudate;
   (c) gripping and enveloping a trailing section of the extrudate with second gripper means wherein said trailing section has an axial length generally equal to the axial length of the leading section;
   (d) severing the leading section from the trailing section by severing the extrudate between the first and second gripping means as said extrudate and gripping means are moving in the forward direction and tension is being applied to the leading section by the first gripping means, whereby said leading section forms said predetermined axial length sleeve of said extrudate;
   (e) continuing moving the severed sleeve by the first gripping means to a discharge station; and
   (f) returning the first gripping means to a position trailing the second gripping means whereby said first gripping means is in a position to grip and envelop another trailing section of the extrudate as the second gripping means continues to move the extrudate in an axial forward direction and apply tension thereto prior to severing another of said sleeve from the extrudate.

2. The method defined in claim 1 wherein the gripped and enveloped leading section is moving in the forward axial direction as the trailing section is gripped and enveloped by the second gripping means.

3. The method defined in claim 1 wherein a vacuum is applied to the leading and trailing sections by the first and second gripping means, respectively, as said sections are being moved in the forward direction.

4. The method defined in claim 1 in which a positive air pressure is applied to the severed sleeve at the discharge station to release said sleeve from the gripping means.

5. The method defined in claim 1 wherein the leading section is severed from the trailing section by a rotating cutter.

6. The method defined in claim 5 wherein the rotating cutter includes three cutting elements, each of which moves through an arcuate cutting length of at least 120°.

7. The method defined in claim 1 wherein the extrudate moves along a longitudinal axis; in which the first and second gripping means each moves along a separate axis parallel to and spaced opposite around said longitudinal axis.

8. The method defined in claim 7 wherein the leading section is severed from the trailing section by a rotating cutter which moves along a first axis parallel to the longitudinal axis and along a second axis perpendicular to said first axis.

9. The method defined in claim 8 wherein the rotary cutter rotates in a plane parallel to said second axis and perpendicular to said first axis.

10. The method defined in claim 7 wherein the first and second gripping means also move perpendicular to the longitudinal axis of the extrudate to grip and envelop said respective extrudate sections.

11. The method defined in claim 1 wherein the gripping means each includes a fixed arcuate section and a pair of pivotally movable arcuate sections, which in combination with said fixed section, extend circumferentially about the tubular extrudate.

12. The method defined in claim 1 wherein the leading section is severed from the trailing section by a plurality of ultrasonic driven cutting blades.

13. The method defined in claim 12 wherein the extrudate moves along a longitudinal axis; in which the ultrasonic driven cutting blades move along the longitudinal axis of the extrudate within said extrudate; and in which said cutting blades are pivotally moved radially outwardly into cutting engagement with the extrudate.

14. The method defined in claim 13 in which the cutting blades rotate in a plane perpendicular to the longitudinal axis of the extrudate after being pivotally moved into cutting engagement for severing the trailing section from the leading section.

15. A system for handling and cutting-off a predetermined length sleeve of an elastomeric material from a generally tubular extrudate of said material, said system including:
   (a) a loading and trailing gripping means for gripping and enveloping longitudinally spaced sections of the tubular extrudate and for moving said extrudate in the axial direction of said extrudate, said gripper means being movable longitudinally parallel and transversely with respect to the axis of said tubular extrudate, and enveloping the tubular extrudate throughout n axis length thereof generally equal to the sleeve length material to be cut therefrom;
   (b) cutter means for severing the extrudate between the spaced gripper means as axial tension is being applied to the extrudate by said gripper means, said cutter means being movable linearly longitudinally with the axis of said tubular extrudate, and is rotationally movable about said extrudate axis when severing said extrudate to form the predetermined sleeve length which is gripped and enveloped by the leading gripper means; and
   (c) means for selectively moving the gripper means and cutter means with respect to the extrudate and for transporting the extrudate in the axial direction and for returning the leading gripper means to a home position trailing the heretofore said trailing gripper means after a sleeve of material has been severed from the extrudate and deposited at a discharge station for gripping another length sleeve of material of said extrudate.

16. The system defined in claim 15 in which the means for moving the gripper means includes a pair of parallel spaced, longitudinally extending main carriage assemblies located on opposite sides of the extrudate axis, and a cross-carriage assembly mounted on each of said main carriage assemblies for transverse movement with respect to the extrudate axis.

17. The system defined in claim 16 in which each of the main carriage assemblies includes a motor activated ball screw for moving the associated gripper means longitudinally along said main carriage assembly, and a second ball screw for moving said gripper means along the cross-carriage assembly transversely with respect to the extrudate axis.

18. The system defined in claim 1 in which each of the gripper means includes a stationary gripper segment, a pair of movable gripper segments movably mounted on extended ends of said stationary gripper segment, said segments collectively form a 360° enclosure for extending circumferentially about and enveloping said tubular extrudate.

19. The system defined in claim 18 in which each of the movable gripper segments is pivotally mounted on the extended ends of the stationary segment by a dual action, pressure actuated cylinder.

20. The system defined in claim 18 in which a fluid manifold is formed in each of the gripper segments and communicates with an interior surface of said segment for holding the extrudate against the segment by applying a vacuum to said manifold.

21. The system defined in claim 20 in which a source of pressurized fluid communicates with the manifold to release the extrudate from the interior surfaces of the gripper segments after termination of the vacuum.

22. The system defined in claim 18 in which each of the gripper segments has an arcuate length of approximately 120°.

23. The system defined in claim 18 in which the stationary gripper segments is mounted on a pedestal which is mounted on the means for moving the gripper means.

24. The system defined in claim 18 in which each of the gripper segments is formed by a plurality of abutting axially extending sections providing gripper means having an adjustable axial length for matching the axial length of the sleeve to be severed from the extrudate.

25. The system defined in claim 15 in which the cutter means includes a fixed mount, a main slide carriage assembly on said mount extending parallel to the axis of the extrudate and a cross-carriage assembly movably mounted on said main carriage assembly.

26. The system defined in claim 25 in which the cutter means further includes a fixed cutting blade and a pair of pivotally movable cutting blades and motor means for driving said cutting blades.

27. The system defined in claim 26 in which the cutting blades are mounted on a support plate which is rotatably mounted for arcuate movement of the cutting blades concentrically with respect to the axis of the extrudate.

28. The system defined in claim 27 in which the support plate is rotatable at least 120° whereby the cutting blades provide at least a 360° cut when severing the tubular extrudate.

29. The system defined in claim 27 in which the cutting blades are moved vertically by the cross-carriage assembly into a cutting position adjacent the extrudate, and are moved horizontally along the axis of the extrudate by the main carriage assembly and are rotated simultaneously with the horizontal movement when severing the sleeve of material from the tubular extrudate.

30. The system defined in claim 26 in which the cutting blades are mounted cn an arcuate plate; in which said arcuate plate is movably mounted by a plurality of rollers on a pedestal and is moved a predetermined arcuate distance by a motor driven belt when severing the sleeve of material from tubular extrudate.

31. The system defined in claim 30 in which the arcuate plate is formed with a pair of opposed V-shaped edges, said edges being engaged in complementary shaped V-grooves formed in spaced pairs of rollers.

32. The system defined in claim 26 in which the motor means for driving the cutting blades are pneumatic motors.

33. The system defined in claim 26 in which the motor means for driving the cutting blades are ultrasonic transducers.

34. The system defined in claim 15 in which the cutter means includes a slide carriage assembly mounted for axial movement within the interior of the extrudate; and in which the cutter means includes at least a pair of pivotally movable cutting blades mounted on the carriage assembly and rotatable about the axis of the extrudate on said carriage assembly whereby the cutting blades provide a 360° cut when severing the tubular extrudate.

35. The system defined in claim 34 in which the cutting blades are driven by ultrasonic transducers.

36. The system defined in claim 34 in which the cutting blades are pivotally mounted on a support bracket which is rotatably mounted on the carriage assembly; and in which the cutting blades are pivotally moved into and out of engagement with the extrudate by links.

37. The system defined in claim 36 in which the support bracket is rotatable about the axis of the extrudate; in which the cutting blades are mounted on holders which are pivotally mounted on the support bracket; and in which the links are eccentrically connected to the cutting blade holders for pivoting the cutting blade into engagement with the extrudate.

38. A gripper assembly adapted to be mounted on a movable carriage for handling and moving a tubular-shaped sleeve of an elastomeric extrudate along a production axis, said gripper assembly including a pedestal for mounting the assembly on the carriage; a stationary gripper segment attached to the pedestal; a pair of movable gripper segments pivotally mounted on extended ends of the stationary gripper segment, said segments collectively forming a 360° enclosure for extending circumferentially about and enveloping the extrudate sleeve; and a fluid manifold formed in each of the gripper segments for holding the extrudate sleeve against the segment by applying a vacuum to said manifold.

39. The gripper assembly defined in claim 38 in which the movable gripper segments are movable with respect to the stationary segment by dual action, pressure actuated cylinders.

40. The gripper assembly defined in claim 38 in which a source of pressurized fluid communicates with the manifold to release the extrudate from the gripper segments after termination of the vacuum.

41. The gripper assembly defined in claim 38 in which each of the gripper segments has an arcuate length of approximately 120°.

42. The gripper assembly defined in claim 38 in which each of the gripper segments is formed by a plurality of abutting axially extending sections providing axial length adjustment for matching the axial length of a length of sleeve to be severed from the extrudate.

43. A cutter assembly for cutting off sleeve lengths from a generally tubular-shaped extrudate of an elastomeric material as the extrudate is moving longitudinally along a production axis, said cutter assembly including a fixed cutting blade and a pair of pivotally movable cutting blades, and motor means for driving said cutting blades; means rotatably mounting the cutting blades for rotating said blades through an arc of at least 120°; carriage means for moving the cutter means longitudinally along and parallel with the production axis of the extrudate, and for moving the cutter means vertically into and out of engagement with the extrudate; and said means for rotatably mounting the cutting blades including a support plate mounted on the carriage means and an arcuate segment movably mounted on said support plate by a plurality of rollers, wherein said arcuate segment is formed with a pair of opposed V-shaped edges which are engaged in complementary-shaped grooves formed in spaced pairs of said rollers.

44. The cutter assembly defined in claim 43 in which the pivotally movable cutting blades are mounted on extended ends of a pair of pivotally mounted arms; and in which said arms are spring biased toward an outward open position disengaged from the extrudate.

45. The cutter assembly defined in claim 44 in which fluid pressure means is mounted on the arcuate segment and engageable with the pivotally mounted arms for overcoming the spring bias and for pivotally moving the arm mounted cutting blades inwardly into engagement with the extrudate.

46. The cutter assembly defined in claim 44 in which the motor means for driving the cutting blades are pneumatic motors.

47. A cutter assembly for cutting off sleeve lengths from a generally tubular-shaped extrudate of an elastomeric material as the extrudate is moving longitudinally along a production axis, said cutter assembly including cutter means for severing the extrudate, said cutter means including a fixed cutting blade and a pair of pivotally movable cutting blades, and motor means for driving said cutting blades; means rotatably mounting the cutting blades for rotating said blades through an arc of at least 120°; carriage means for moving the cutter means longitudinally along and parallel with the production axis of the extrudate, and for moving the cutter means vertically into and out of engagement with the extrudate, said means for rotatably mounting the cutting blades including a support plate mounted on the carriage means and an arcuate segment movably mounted on the support plate by a plurality of rollers; and a drive motor mounted on the support plate operatively connected to the arcuate segment by a timing belt for moving said arcuate plate through the 120 ° arc.

48. A cutter assembly for cutting off sleeve lengths from a generally tubular-shaped extrudate of an elastomeric material as the extrudate is moving longitudinally along a production axis, said cutter assembly including cutter means for severing the extrudate, said cutter means including a fixed cutting blade and a pair of pivotally movable cutting blades, and motor means for driving said cutting blades; means rotatably mounting the cutting blades for rotating said blades through an arc of at least 120°; carriage means for moving the cutter means longitudinally along and parallel with the production axis of the extrudate, and for moving the cutter means vertically into and out of engagement with the extrudate; and carriage means including a horizontal carriage for moving the cutter means parallel along the production axis, and a vertical carriage mounted on the horizontal carriage for moving the cutter means vertically into and out of engagement with the extrudate.

49. A cutter assembly for cutting off sleeve lengths from a generally tubular-shaped extrudate of an elastomeric material as the extrudate is moving longitudinally along a production axis, said cutter assembly including cutter means for severing the extrudate, said cutter means including a fixed cutting blade and a pair of pivotally movable cutting blades, and motor means for driving said cutting blades, said motor means being ultrasonic transducers; means rotatably mounting the cutting blades for rotating said blades through an arc of at least 120°; and carriage means for moving the cutter means longitudinally along and parallel with the production axis of the extrudate, and for moving the cutter means vertically into and out of engagement with the extrudate.

* * * * *